(12) United States Patent
Vija et al.

(10) Patent No.: US 8,577,103 B2
(45) Date of Patent: Nov. 5, 2013

(54) MULTIMODAL IMAGE RECONSTRUCTION

(75) Inventors: Alexander Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 428 days.

(21) Appl. No.: 12/369,159

(22) Filed: Feb. 11, 2009

(65) Prior Publication Data

US 2010/0014730 A1 Jan. 21, 2010

Related U.S. Application Data

(60) Provisional application No. 61/081,121, filed on Jul. 16, 2008.

(51) Int. Cl.
*G06K 9/00* (2006.01)

(52) U.S. Cl.
USPC .......................................................... 382/128

(58) Field of Classification Search
USPC ......................................... 382/128, 130–132
See application file for complete search history.

(56) References Cited

U.S. PATENT DOCUMENTS

| 5,155,365 A | 10/1992 | Cann et al. |
| 6,399,951 B1 | 6/2002 | Paulis et al. |
| 6,956,925 B1 | 10/2005 | Hoffman |
| 7,277,582 B2 * | 10/2007 | Paragios ....................... 382/199 |
| 2004/0030246 A1 * | 2/2004 | Townsend et al. ............ 600/427 |
| 2006/0151705 A1 * | 7/2006 | Manjeshwar et al. ... 250/363.03 |

OTHER PUBLICATIONS

Erkan U Mumcuoglu, Bayesian reconstruction of PET image: methodology and performance analysis, 1996, Phys. Med. Biol., 41, 177-1807.*

Shieh, et al., "Iterative image reconstruction using prior knowledge," J Opt Soc Am A Opt Image Sci Vis, vol. 23, No. 6, pp. 1292-1300, Jun. 2006.

Adluru, et al., "Temporally constrained reconstruction of dynamic cardiac perfusion MRI", Magn. Reson. Med., vol. 57, No. 6, pp. 1027-1036, (Jun. 2007).

Hudson, et al., "Accelerated image reconstruction using ordered subsets of projection data", IEEE Trans. Med. Imaging, vol. 13, No. 4, pp. 601-609 (1994).

Turkheimer, et al., "PET image denoising using a synergistic multi-resolution analysis of structural (MRI/CT) and functional datasets", J. Nucl. Med., 49:657-66, 2008.

Somayajula, et al. "PET image reconstruction using anatomical information through mutual information based priors." pp. 2722-2726, 2005.

(Continued)

*Primary Examiner* — Thanh Luu
*Assistant Examiner* — Renee Naphas
(74) *Attorney, Agent, or Firm* — Peter Kendall

(57) ABSTRACT

Computer-implemented methods of reconstructing an image object for a measured object in object space from image data in data space include causing a computer to execute instructions for providing zonal information separating the object space into at least two zones, providing at least two zonal image objects, each zonal image object being associated with one of the at least two zones, reconstructing the image object using a data model derived from forward projecting the zonal image objects into data space, wherein the contribution of each zonal image object to the data model is weighted according to a zonal scaling factor, and outputting the image object.

31 Claims, 12 Drawing Sheets

(56) References Cited

OTHER PUBLICATIONS

Sureau, et al. "Impact of Image-Space Resolution Modeling for Studies with the High-Resolution Research Tomograph," J Nucl Med, vol. 49, No. 6, pp. 1000-1008, Jun. 1, 2008.
Alenius, et al.., "Generalization of median root prior reconstruction," IEEE Trans. Med. Imaging, vol. 21, No. 11, pp. 1413-1420, Nov. 2002.
Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.
Gindi, G., et al., "Bayesian reconstruction of functional images using anatomical information as priors", IEEE Trans. Med. Imaging, vol. 12, No. 4, pp. 670-680, 1993.
Zhenyu, et al., "Approximate maximum likelihood hyper-parameter estimation for Gibbs priors." Image Processing, IEEE Transactions on, vol. 6, No. 6, pp. 844-861, 1997.
Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.
Parra, et al., "List-mode likelihood: EM algorithm and image quality estimation demonstrated on 2-D PET," Medical Imaging, IEEE Transactions on, vol. 17, No. 2, pp. 228-235, 1998.
Nuyts, et al. "Simultaneous maximum a posteriori reconstruction of attenuation and activity distributions from emission sinograms," Medical Imaging, IEEE Transactions on 5 vol. 18, No. 5. pp. 393-403, 1999.
Hero, et al., "Information analysis of single photon emission computed tomography with count losses", Medical Imaging 9, IEEE Transactions, pp. 117-127 (1990).
Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.
Kawata, et al., "Constrained Iterative Reconstruction by the Conjugate Gradient Method" IEEE Trans. Med. Imaging, vol. 4, No. 2, pp. 65-71, 1985.
LaRiviere, et al., "Nonparametric regression sonogram smoothing using a roughness-penalized Poisson likelihood objective function", IEEE Trans. Med. Imaging, vol. 19, No. 8, pp. 773-786, 2000.
Chiao, et al., "Model-based estimation for dynamic cardiac studies using ECT", IEEE Trans. Med. Imaging, vol. 13, No. 2, pp. 217-226, 1994.
Nichols, et al, "Spatiotemporal reconstruction of list-mode PET data," Medical Imaging, IEEE Transactions on, vol. 21, No. 4, pp. 396-404, 2002.
Kadrmas, et al., "4D maximum a posteriori reconstruction in dynamic SPECT using a compartmental model-based prior," Physics in Medicine and Biology, vol. 46, No. 5, pp. 1553-1574, 2001.
D. J. Kadrmas, "Statistically regulated and adaptive EM reconstruction for emission computed tomography," Nuclear Science, IEEE Transactions on, vol. 48, No. 3, pp. 790-798, 2001.
Shao, L., et al., "Information gain from count correction in SPECT image reconstruction and classification", IEEE Trans. Nucl. Science, vol. 37, No. 2, pp. 652-657, 1990.
Shieh, et al., "Image reconstruction: a unifying model for resolution enhancement and data extrapolation. Tutorial," J Opt Soc Am A Opt Image Sci Vis, vol. 23, No. 2, pp. 258-266, Feb. 2006.
Mighell, K.J., "Parameter estimation in astronomy with poisson-distributed data I. The statistic", Astrophys. J. 518, 380-393, 1999.
Wesolowski, C.A., et al., "Improved lesion detection from spatially adaptive, minimally complex Pixon® reconstruction of planar scintigraphic images", Comput. Med. Imaging Graph., 65-81, 2005.
Wernick, et al., "Emission tomography: the fundamentals of PET and SPECT", Chapters 7,11 and 21, Elsevier, Academic Press, 2004.
Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).
Fessler, et al., "Space-alternating generalized expectation-maximization algorithm", Signal Processing, IEEE T-SP 42 (10): 2664-77, (Oct. 1994).
Puetter, et al., "Digital Image reconstruction: deblurring and denoising", Annu. Rev. Astro. Astrophys., 2005, 43:139-194.
Puetter, et al., "The pixon method of image reconstruction", Astronomical Data Analysis Software and Systems VIII, Astronomical Society of the Pacific, Conference Series 1999, 172, 307-316.
Lehovich, et al., "Human observer LROC study of lesion detection in Ga-67 SPECT images reconstructed using MAP with anatomical priors", 2006 IEEE nucl., Sci. Symp. Conf. Rec., 1699-702.
Lehovich, et al., "Choosing anatomical-prior strength for MAP SPECT reconstruction to maximize lesion detectability", 2007 IEEE Nucl. Sci. Syrnp. Conf. Rec., 4222-5.
K.J. Mighell, "Parameter estimation in astronomy with Poisson-distributed data. II. The modified chi-square gamma statistic", 2000, arXiv:astro-ph/0007328.
J. Hadamard, "Sur les problèmes aux dérivèes partielles et leur signification physique", Princeton Uni. Bull., 13, 49-52, (1902).
Tsui, B.M.W., et al., "Quantitative cardiac SPECT reconstruction with reduced image degradation due to patient anatomy", IEEE Trans. Nuc. Sci., 41, 2838-44, 1994.
Gorman, J.D. and Hero, A.O., "Lower bounds for parametric estimation with constraints", IEEE Trans. Information Theory, vol. 36, No. 6, pp. 1285-1301, 1990.
Siemens Medical, "Symbia SPECT Working for You", Product Information, 2007.
Haacke, et al., "Constrained reconstruction: A super-resolution, optimal signal-to-noise alternative to the Fourier transform in magnetic resonance imaging", Medical Physics, vol. 16, No. 3, pp. 388-397, 1989.
Halder, et al., "Anatomically constrained reconstruction from noisy data", Magn. Reson. Med., vol. 59, No. 4, pp. 810-818, Apr. 2008.
Rangarajan, et al., "A model-based approach for filtering and edge detection in noisy images", IEEE Trans. Circuits and Systems, vol. 37, No. 1, pp. 140-144, 1990.
Roggemann, et al., "Model-based image reconstruction by means of a constrained least-squares solution", Appl Opt, vol. 36, No. 11, pp. 2360-2369, Apr. 10, 1997.
Roy, et al., "Three-dimensional unconstrained and constrained image-reconstruction techniques applied to fluorescence, frequency-domain photon migration", Appl. Opt., vol. 40, No. 13, pp. 2206-2215, May 1, 2001.
Tapiovaara, M.J. and Wagner, R.F., "SNR and noise measurements medical imaging: I. A practical approach based on statistical decision theory", Phys. Med. Biol., vol. 38, pp. 71-92, 1993.
Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).
Green, P.J. and Silverman, B.W., "Generalized Linear Models: A Roughness Penalty Approach", Chapman & Hall/CRC, 1994 (Webpage print out of coverpage, synopsis and table of contents from www.bn.com).

* cited by examiner

MULTIMODAL IMAGE RECONSTRUCTION

CROSS-REFERENCE TO RELATED APPLICATION

This application claims the benefit of priority under 35 U.S.C. §119(e) of U.S. Provisional Patent Application Ser. No. 61/081,121, filed on Jul. 16, 2008.

TECHNICAL FIELD

This invention relates to image reconstruction, and in particular, to image reconstruction in medical imaging.

BACKGROUND

Medical imaging of metabolic and biochemical activity within a patient is known as functional imaging. Functional imaging techniques include, for example, nuclear imaging such as Positron Emission Tomography (PET), Single Photon Computed Tomography (SPECT), functional magnetic resonance imaging (IMRI), and functional computed tomography (fCT). The reconstruction of a functional image from data acquired by functional imaging is often difficult because the data is often characterized by a small signal rates and small low signal-to-noise ratio. For nuclear imaging, for example, the count rate is limited by the amount of a radioactive substance that can be administered without harming the patient.

In addition, a functional image does not necessarily provide structural information. Thus, one evaluates a functional image often with the help of a structural image.

An overview of SPECT, PET systems, their combination with computer tomography (CT) systems as well as iterative image reconstruction for emission tomography is given in chapter 7, chapter 11, and chapter 21 of M. Weruick and J. Aarsvold, "Emission tomography: the fundamentals of PET and SPECT," Elsevier Academic Press, 2004, the contents of which are herein incorporated by reference.

An overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference.

SUMMARY

The invention is based in part on the recognition that one can reconstruct a functional image of an examined object by considering the spatio-temporal structure of the object when approximating the functional image according to the acquired functional data. Specifically, the spatio-temporal structure of the object allows separating the object into multiple zones. The volume within each of those zones is treated equally in the reconstruction, but the treatment can be different for different zones. One aspect of treating the different zones different is that one can allocate different amounts of signal to the zones according to the zone's contribution to the functional feature observed.

Multimodal imaging provides, in addition to the functional image data, the possibility to acquire information about the spatio-temporal structure of the examined object. This information (in the following also referred to as supplemental information) can include anatomical information about the imaged tissue (e.g., geometry and type), the movement of the tissue (breathing, cardiac movement), the temporal behavior of the contrast agent/radioactive substance (flow, absorption, half-life). For example, high resolution imaging such as CT imaging and magnetic resonance imaging (MRI) can provide precise anatomical information about the examined object. For example, one can manually assign each organ to its own zone. Automated assigning of zones can be based, for example, on the absorption coefficients provided by CT imaging and/or on automated segmentation of CT and/or MR image data into different tissue types.

When reconstructing an image object based on the functional image data and the support information (multimodal image reconstruction), the contributions of the zones to the reconstructed image object can be optimized during the reconstruction and/or pre-assigned based on the supplemental information. Moreover, during the reconstruction smoothing operations can be performed zone-specific. For example, pixon smoothing can be restricted to a zone and pixon kernel functions can be adapted to the geometry of a zone.

Multimodal reconstruction differs from maximum a posteriori (MAP) reconstruction using an anatomical prior, as described for example, in chapter 21 of M. Wermick and J. Aarsvold. "Emission tomography: the fundamentals of PET and SPECT," and B. M. W. Tsui et al., "Quantitative cardiac SPECT reconstruction with reduced image degradation due to patient anatomy," IEEE Trans. Nuc. Sci., 41, 2838-44, 1994. The MAP technique is a constrained reconstruction, which adds an anatomical penalty term (e.g., the anatomical prior) to the log-likelihood merit function. The MAP reconstruction is therefore a compromise between the log-likelihood merit function based on the data and the anatomical prior.

In contrast, multimodal reconstruction may imposes a separation in anatomical zones of the reconstructed image object but the zones do not modify the merit function of the applied reconstruction algorithm In one aspect, the invention features computer-implemented methods of reconstructing an image object for a measured object in object space from image data in data space that include causing a computer to execute instructions for providing zonal information separating the object space into at least two zones, providing at least two zonal image objects, each zonal image object being associated with one of the at least two zones, reconstructing the image object using a data model derived from forward projecting the zonal image objects into data space, wherein the contribution of each zonal image object to the data model is weighted according to a zonal scaling factor, and outputting the image object.

In another aspect, methods of multimodal imaging of an examined object include performing a support imaging operation of the examined object, thereby generating support information, identifying at least two zones in the examined object based on the support information, performing a functional imaging operation of the examined object by detecting a functional signal (e.g. nuclear events), generating image data from the functional signal, reconstructing an image object from the image data under the consideration that portions of the functional signal are associated with the zones, and outputting the image object.

In another aspect, computer-implemented methods of reconstructing an image object for a measured object in object space from image data in data space include causing execution of instructions for receiving zonal information separating the object space into at least two zones, providing an input object of at least one initial zonal image object, each initial zonal image object associated with one of the at least two zones, performing an iterative reconstruction of the image object, wherein the iterative reconstruction includes performing a zonal forward projection of the input object, thereby generating a data model in data space, determining an update object in object space based on the data model and the image data, updating the at least one initial zonal image object with the update object, and generating a first output object that includes at least one updated zonal image object, in additional iteration steps, using generated output objects as input objects of succeeding iterations, thereby generating additional output objects, determining the image object from one of the output objects, and outputting the image object.

In another aspect, functional imaging devices include a detector unit for detecting a functional signal (e.g., emitted radiation) from a measured object within a detecting area and providing image data in data space indicative of the detected signal, and a reconstruction unit for reconstructing an image object in object space from the image data, the reconstructing unit configured to receive zonal information separating the object space into at least two zones, reconstruct an image object from the image data under the consideration that portions of the functional signal are associated with the zones, and provide the image object at an output of the reconstruction unit.

Implementations may include one or more of the following features.

In some embodiments, reconstructing the image object can include combining updated zonal image objects of one of the iterations to form the image object, wherein the contribution of each updated zonal image object to the image objected is weighted according to its zonal scaling factor.

In some embodiments, providing zonal information can include deriving the zonal information from support information about the measured object. The support information can include information about the spatio-temporal structure of the examined object, for example, derived from CT imaging and/or MR imaging of the measured object. The support information, e.g. a CT and/or MR image, can be co-registered with the object space of the image object.

In some embodiments, providing zonal information can include generating the zonal information by analyzing support information about at least one of an anatomical feature of the examined object, a disease specific feature, a feature specific to the application used to generate the image data, and a biomarker specific feature.

Zonal information can group object points of the object space into a zone based on at least one of a common anatomical feature, a common application specific feature, a common disease specific feature, a common biomarker specific feature of the object points to provide a geometrical area within the object. A zone can include multiple disjoint areas and an object point can be assigned to more than one zone.

A zone can correspond to a type of tissue. A zone can correspond to a target organ of a biomarker. A zone can correspond to an area within a field of view of a functional (e.g., nuclear) imaging apparatus used to generate the image data.

In some embodiments, the zonal information can include a Null zone surrounding the examined object within the field of view or a Null zone corresponding to the geometry of an implant.

Zonal information can include time-dependent changes of the position and/or geometry of one or more zones.

Providing zonal information can include providing a zone-function relating object points of the object space of the image object to a zone. A value of the zone-function at an object point can correspond to a level of affiliation of that object point with the zone. For example, values can be in the range from 0 to 1, where a value of 0 indicates no affiliation, a value of 1 indicates the object point affiliates only with the respective zone, and a value between 0 and 1 indicates that the object point can also contribute to one or more additional zones.

In some embodiments, zonal information can be defined based on values of an attenuation map derived from a computer tomography image of the examined object.

In some embodiments, forward projecting can generate contributions to the data model from a zonal image object only for those object points that are affiliated with the respective zone.

In some embodiments, forward projecting a zonal image object can include multiplying the object points of the at least one zonal image object by the respective value of the zone-function.

In some embodiments, reconstructing the image object can include calculating a product of a zonal image object and a respective zonal scaling factor thereby generating a scaled zonal input object.

In some embodiments, reconstructing the image object can include performing an iterative reconstruction of the image object, wherein the iterative reconstruction can include a series of iterations, each iteration of which includes forward projecting the zonal image objects, thereby generating zonal data modals, combining the zonal data models to form the data model in data space, determining an update object in object space based on the data model and the image data and updating the zonal image objects with the update object, thereby generating at least two updated zonal image objects.

Combining the zonal data models to form the data model can include a correction of the zonal data model by a scattering correction term. Combining the zonal data models to form the data model can include a summation over the zonal data models or over scatter corrected zonal data models for multiple zones.

In some embodiments, reconstructing the image object can include determining the zonal scaling factors. For example, reconstructing the image object can include optimizing the zonal scaling factors. The scaling factor of a zone can correspond to the portion of a functional (e.g., nuclear) signal associated with that zone. The scaling factor of a zone can correspond to the portion of signal uptake allowed for that zone during reconstruction.

In some embodiments, reconstructing the image object can include receiving the zonal scaling factors from a database that includes zonal scaling factors in dependence of at least one of tissue type, disease, patient parameters such as age, size, or weight.

In some embodiments, reconstructing the image object can include deriving the zonal scaling factors from a renormalization operation. The renormalization operation can be repeated during the reconstruction, thereby adapting the scaling factors to update zonal image objects.

The renormalization operation can include determining a merit function of a modified Chi-square gamma statistic or a Log-likelihood function to optimize the scaling factors for given zonal image objects.

In some embodiments, reconstructing the image object can include performing an update operation in data space comparing the data model and the image data. The update operation can include calculating a merit function of an algorithm selected from the group consisting of a maximum-likelihood expectation-maximization algorithm, an ordered-subset expectation-maximization algorithm, non-negative least-squares algorithm, and a conjugate-gradient minimization algorithm.

The update object can include object-point specific update factors and wherein reconstructing the image object can include multiplying, for each object point of a zone, an entry of the respective zonal image object by the respective update factor.

The update object can include object point specific update additives and wherein reconstructing the image object can include adding, for each object point of a zone, an entry of the respective zonal image object and the respective update additive.

In some embodiments, reconstructing the image object can include zonal smoothing of at least one of the zonal image objects. The zonal smoothing can include a smoothing operation selected from the group consisting of smoothing based on pixon smoothing, smoothing based on Fourier filtering, smoothing based on wavelet filtering, smoothing based on filtering with a Wiener filter, and smoothing based on filtering with a fixed filter.

Examples of image data can include emission tomography data (e.g., from SPECT or PET), data from functional CT, and fMRI data of the measured object.

Reconstructing the image object can include providing at least two zonal image objects that correspond to the at least two zones and scaling the zonal image objects according to their portions.

The detector unit of the functional imaging device can include a detector system selected from the group consisting of a positron emission tomography detector system, a single photon computed tomography detector system, a fCT detector system, and a fMRI detector system.

The functional imaging device can further include an input device and a display device, and the reconstruction unit can be further configured to receive support information, to display the support information on the display device to a user, and to derive the zonal information from the support information and input from the user.

The functional imaging device can further include a support imaging device for deriving support information about the measured object, e.g., a CT imaging system, a MR imaging system, or a ultrasound imaging system. The reconstruction unit can be further configured to receive the support information from the support imaging device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
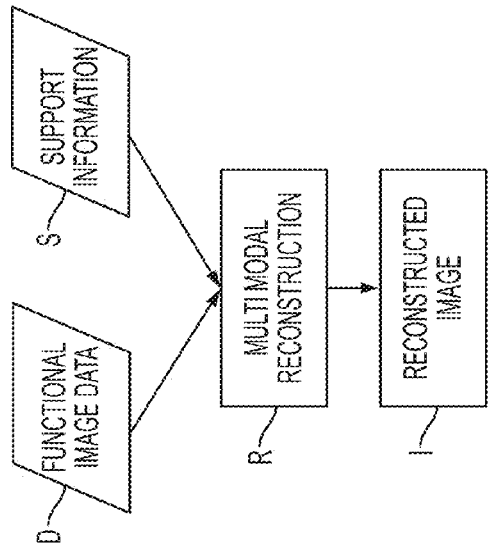
FIG. 1 is a schematic overview of a multimodal imaging system.

FIG. 1 shows a multimodal reconstruction unit 1 with an input device 2 and a display unit 3. The reconstruction unit 1 receives information (e.g., measured data of an examined area of a patient) from two data sources, a functional imaging system 4 and a source of support information 5 (hereinafter also referred to as a support imaging system or support modality), and reconstructs an image object that reproduces functional features of the examined area. Examples of a source for support information include a computed tomography (CT) system, e.g. a transmission CT system and a MR imaging system Referring to FIG. 2, the functional imaging system 4 measures image data D of a functional process in the patient's body by using, e.g., nuclear properties of matter. Examples of such imaging techniques include nuclear imaging such as SPECT and PET. For these types of nuclear imaging, one administers a radioactive substance, usually a disease specific biomarker, to the patient and detects emitted radiation with a detector system, e.g., with a ring detector for PET or with one or several gamma cameras for SPECT. In general, the detector system of the functional imaging system 4 provides functional data, e.g., raw data or preprocessed data to the multimodality reconstruction unit 1.

Figure 2:
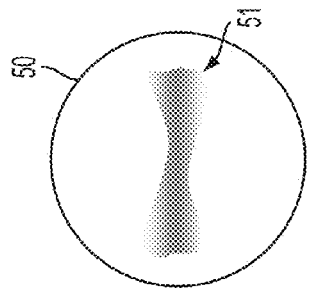
FIG. 2 is a simplified flowchart of a multimodal image reconstruction.

As shown in FIG. 2, the multimodality reconstruction unit 1 performs a multimodal reconstruction R. The multimodal reconstruction can use a system matrix H to describe the properties of the functional imaging system 4 to iteratively improve a data model of an image object I representing the functional image data D. The image object I can then be displayed on the display 3, e.g., using well-known volume rendering techniques.

The image object I, which is defined in an object space, is a reconstruction of the functional image data D measured in a data space. The object space is the space in which the result of the image reconstruction is defined and which corresponds, for example, to the 3D volume (field-of-view or "FOV") that was imaged using the functional imaging system 4.

Zonal information, i.e., information about zones within the examined object, can be derived from support information S. In some embodiments, the multimodal reconstruction R can improve the image quality and/or reduce the acquisition time of the functional imaging process by considering the zonal information in the reconstruction.

The support information is, for example, measured with the support modality 5. Examples of support information include anatomical information about the examined object (shape, volume, thickness, density of tissue types), type of disease and other disease specific features (density change within tissue (e.g. bone tissue), calcification), type of application and other application specific features used to generate the image data (time dependence, easily identifiable regions of lower interest but high signal (e.g. accumulation of a biomarker in the bladder)), and biomarker specific features (pharmacokinetic features, tissue types to which biomarkers attach, time scale of processes; one, two, or more biomarkers). The zonal information can be derived by automated or manual analysis of the support information and correspond to a separation of the object space in two or more space, usually including Null zone surrounding the examined object.

Figure 4:
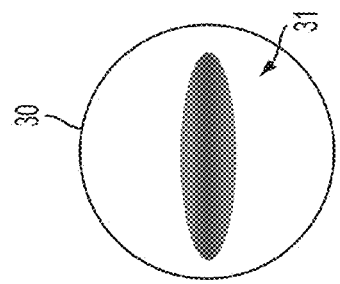
FIG. 4 is a simplified CT image.
Figure 3:
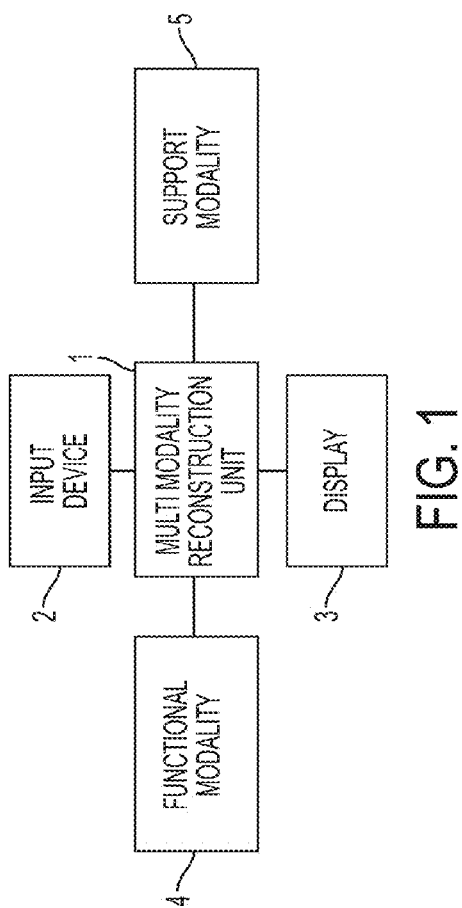
FIG. 3 is a simplified conventional functional image.

FIG. 3 illustrates how a functional (e.g., nuclear) image 30, e.g. of a bone, may result in less resolved distribution 31 of the functional activity density associated with a functional process. Conversely, a CT scan, while generally insensitive to functional processes, provides considerable anatomical information. For example, in FIG. 4, a CT scan provides an anatomical image 40 that clearly resolves the shape of a bone 41.

In conventional functional imaging, functional and anatomical images are reconstructed separately and are only presented together (e.g. as overlaying images) to the diagnosing physician. However, the resolution and image quality of the functional and anatomical images is determined by the respective reconstruction algorithms associated with the functional and anatomical imaging techniques. Sometimes, nuclear imaging techniques use an attenuation map (also referred to as μ-map) derived from a CT scan to compensate for signal loss within the examined object.

In contrast, the multimodal reconstruction R described herein uses zonal information derived from the support information S generated by a second modality. The support information S can provide structural information about the measured object such that the object space can be divided in multiple zones. For each such zone, one can constrain the reconstruction of the image object by using a zonal image object. Each of the zonal image objects can be treated differently in the reconstruction but the zonal image objects are used together to, for example, generate a data model of the reconstructed image object I. A zone-specific operation is, for example, a smoothing operation that is performed on individual zonal image objects.

Support information S can further relate to the energy and event time of the detected photons. Thus, a zone can also be based on those parameters. For example, a 4D zone considers temporal changes of the position and/or shape of a zone, which can be caused be any kind of movement of the object (e.g., breathing and heart activity). Accordingly, the object space can include additional (non-geometric) dimensions when appropriate.

Figure 5:
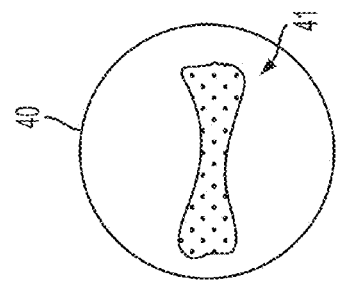
FIG. 5 is a simplified multimodal reconstructed functional image.

Referring to FIG. 5, a multimodal reconstructed image 50 can show functional activity 51 with increased anatomical accuracy. Thus, multimodal reconstruction can use the anatomy of the examined object when reconstructing the functional image object. In an example, multimodal reconstruction uses the distribution of a target tissue of a biomarker (e.g., a specific organ or a bone) when reconstructing the functional density of that biomarker that primarily accumulates within that target tissue.

In multimodal reconstruction, the resolution of the support information can affect the resolution of the functional image object and the sensitivity of the functional process. Within a zone, the functional resolution and sensitivity may prevail. For example, along the extension of the bone shown in FIG. 5, the resolution is governed by the functional modality, e.g., by SPECT and PET. However, across a zone, e.g., at the interface of the bone with surrounding tissue, the resolution may be improved to that obtained using the support modality, e.g., to the high resolution of a CT system.

Thus, multimodal reconstruction can allow quantitative functional imaging of a predetermined zone. One example of such a predetermined zone is a zone selected to encompass one or more anatomical structures.

Zonal Information

In general, a zone includes object points with similar features. A zone need not be an enclosed area, and can in fact consist of multiple disjoint areas. One zone usually will be a zone representing a target organ or target tissue of the biomarker used for the functional image. The area of the object space that surrounds the examined object is usually referred to as a Null zone and does not contribute to the functional signal.

The segmentation of the examined object into zones can be automated or user-defined. The segmentation of the object into zones is based on support information derived, e.g., from CT images and/or nuclear magnetic resonance images, such as μ-map (CT), ρ-Z map (contrast or dual-source CT). In general, CT-images and MR-images can provide information about the anatomy. For example, a CT image can provide support anatomical information of the object space based on the measured absorption of the imaging radiation. In particular, support information can include the absorption coefficients (μ-values) of the measured object and information about one or more intervals of the absorption coefficients $[\mu_{min}; \mu_{max}]$ that are specific for a tissue type or organ. Similar absorption coefficients (p-values) derived from a CT scan can be used to determine zones. The information about how the object space is separated into zones is referred to as zonal information.

Figure 6A:
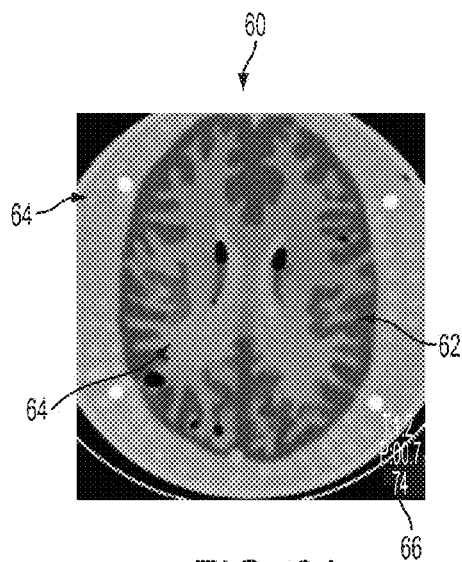
FIG. 6A is a CT scan of a phantom.
Figure 6B:
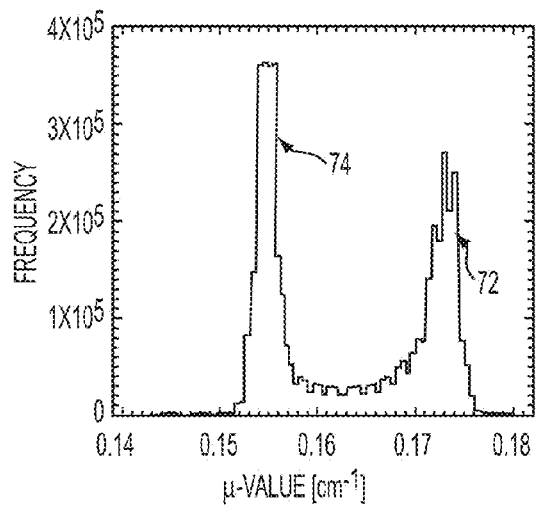
FIG. 6B is a histogram of absorption coefficients of the CT scan of the phantom.
Figure 7:
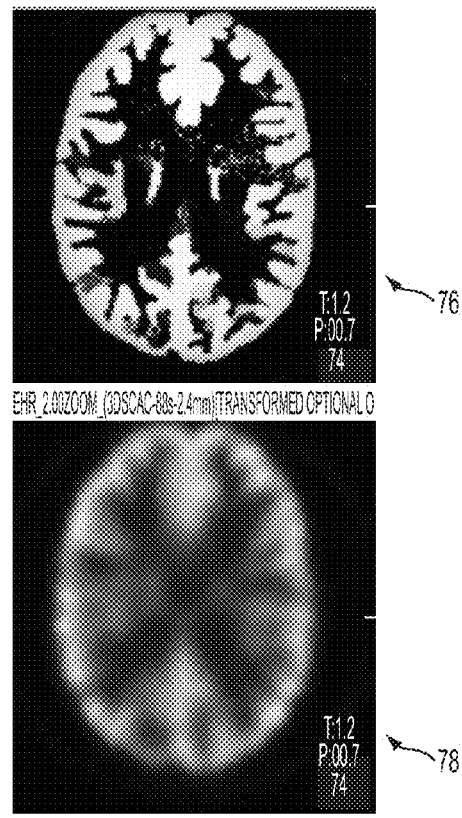
FIG. 7 is a side-by-side presentation of a multimodal reconstructed image and a Flash 3D reconstructed image of the phantom of FIG. 6A.

FIGS. 6A, 6B, and 7 illustrate the concept of zonal separation for a 3D Hoffman brain phantom in a cylindrical chamber. A CT image 60 of a Hoffman brain phantom is shown in FIG. 6A. The Hoffman brain phantom consists of plastic 62 representing brain tissue surrounded by water 64. Each object point of the CT image 60 is characterized by an attenuation coefficient (also referred to as μ-value of that object pointing). FIG. 6B shows a histogram plot of attenuation coefficients derived from the CT-images 60 of the Hoffman brain phantom. The histogram shows two peaks of the μ-values. One peak 72, which corresponds to the plastic material 62 of the Hoffman phantom, is at a μ-value of about 0.172 $cm^{-1}$, the other peak 74, which corresponds to the water 64 in the Hoffman brain phantom, is at a μ-value of about 0.155 $cm^{-1}$. Accordingly, one could assign each object point within the Hoffman phantom to one of the two zones, i.e., the water-zone or the plastic-zone. For the phantom, the water-zone can be defined by μ-values in the range from 0.144 $cm^{-1}$ to 0.162 $cm^{-1}$. In general, the limiting μ-values depend for nuclear imaging, for example, on the biology, chemistry, and physics of the biomarker. In addition to the water-zone and the plastic-zone, one can assign the objects points surrounding the Hoffman phantom to a Null zone 66.

An example of a multimodal reconstructed functional image in comparison with a conventional reconstruction is shown in FIG. 7. Image 76 is a conventionally reconstructed image of the Hoffman brain phantom shown in FIG. 6A using Flash 3D reconstruction, while image 78 is a multimodal reconstruction based on the same image data. The multimodal reconstruction used the zonal information about the distribution of the plastic and the water derived from the CT-image 60, i.e., the spatial form of the plastic-zone and the water-zone, and shows an increased image quality.

Figure 8:
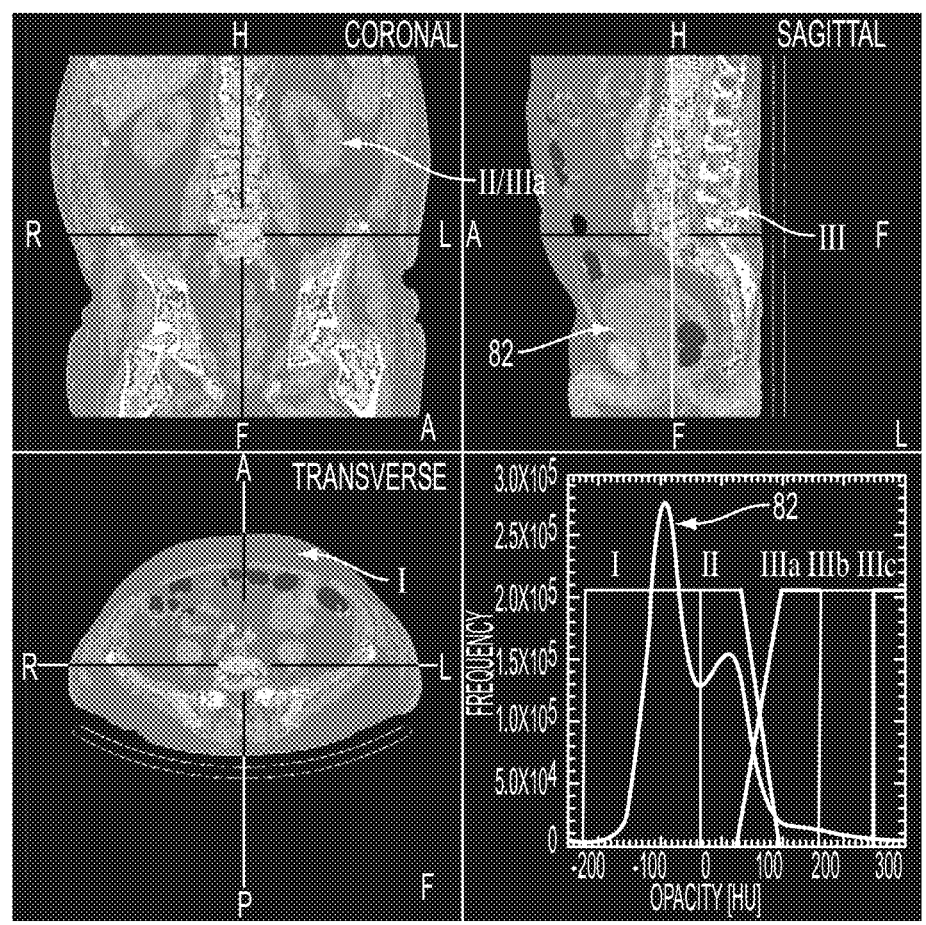
FIG. 8 is a zone planning view based on a CT scan of the upper body of a patient.
Figure 9:
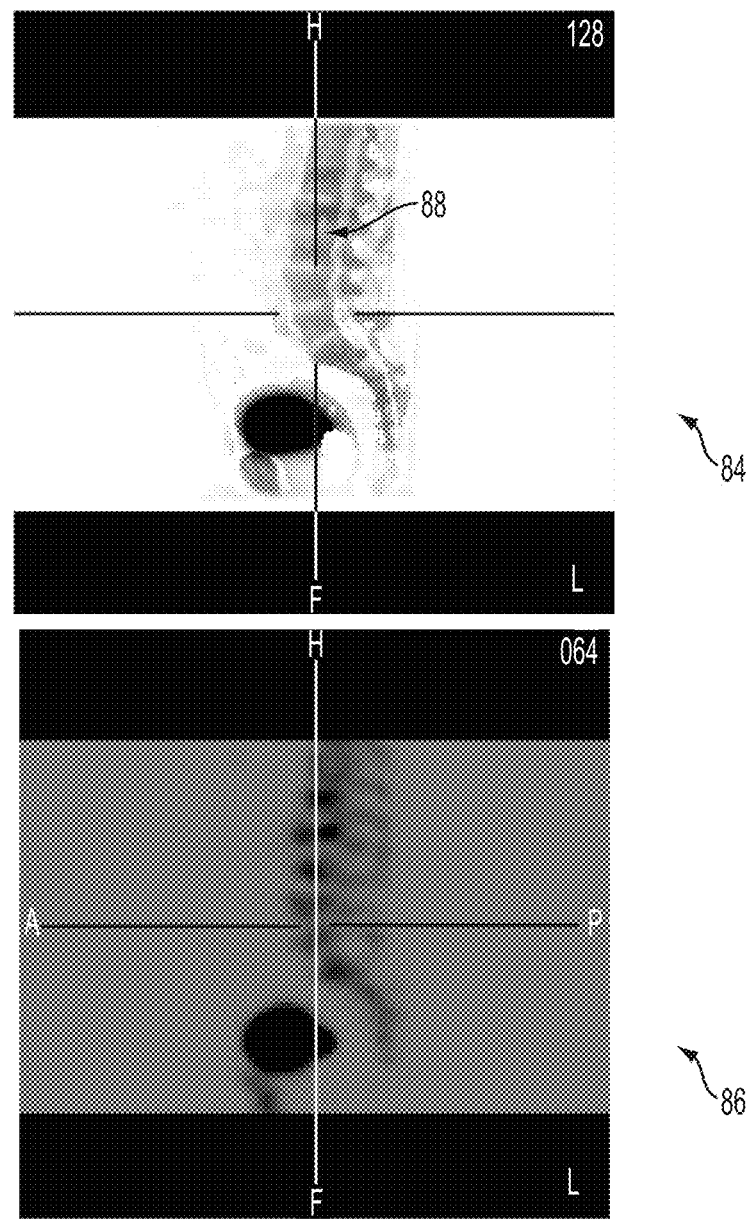
FIG. 9 is a side-by-side presentation of a multimodal reconstructed image and a Flash 3D reconstructed image of the upper body of FIG. 8.

FIGS. 8 and 9 illustrate automated separation of an upper body in multiple zones based on the determined absorption coefficients of a CT scan. The zone planning view of FIG. 8 includes a coronal view, a sagittal view, and a transverse view of various zones that have been assigned with different grey scale values. Based on the CT scan data of the upper body, the absorption coefficients are provided as a histogram 80, in which the absorption coefficients are given in Hounsfield Units HU.

Essentially, three zones are assigned: fatted tissue (zone I) from −250 HU to −30 HU, muscular tissue (zone II) −30 HU to +30 HU with a linearly decreasing ramp from +30 HU to +95 HU, and bone tissue. The bone tissue is further separated in three sub-zones: softer bone tissue (zone IIIa) from +95 HU to +160 HU with a linearly increasing ramp from +30 HU to +95 HU; harder bone tissues (zone IIIb) from +160 HU to +250 HU, and harder bone tissues (zone IIIc) above +250 HU. The border values of the zones as well as the ramp shapes are manually chosen and can be readjusted if appropriate. In general, those values can be assigned for each scan, for example, in dependence of the tissue types of interest, the radioactive substance, and the type of functional imaging.

In the transverse view, fatted tissue of zone I is pointed out. Zone I shows in general a homogenously identified spatial structure. In contrast, the muscular tissue of zone II and the soft bone tissue of zone IIIa form spatially not clearly separated areas as shown in the coronal view. The similar absorption coefficient of those tissue types result in a fast spatial variation with regard to the affiliation of neighboring object points to different zones. Clarifying manually or, e.g., providing additional supplemental information from an MR scan or from the functional imaging itself can generate more homogeneously shaped spatial zone structures. The to some extent artificial separation into three bone zones can be done, for example, when adapting zones to a radioactive substance accumulating at a specific type of bone tissue. Such a zoning may result in a complex zonal structure it can be seen by the zones IIIa to IIIc as shown in the sagittal view of FIG. 8.

A similar segmentation into zones can be performed based on a measured MR image, which can provide high contrast information for soft tissue.

In addition to the automated segmentation in different zones, one can manually assign zones to specifically known areas of interest (e.g., specific zoning of lymph nodes) or to exclude signal from an area (e.g., the bladder). The latter is illustrated as an example by a manually assigned bladder zone 82 in the sagittal view, which may allow excluding large amounts of signal if the radioactive substance accumulates in the bladder.

To summarize, by identifying features of the examined object, one can generate zonal information, which separates the object space into zones. The zonal information can in general be derived from supplemental performed medical imaging. In addition, information from the functional imaging process itself can be used when separating the object space into zones. For example, one can introduce the additional condition that an intensity value of a preliminary reconstructed functional image is fulfilled at an object point or over a group of object points to additionally distinguish tissue with similar absorption coefficients but with different affinity to a radioactive substance.

The zonal information can be provided as a zone-function $z(r)$. The zone-function can be a pure functional presentation, indicating position(s) and shape(s) in object space. Another presentation of a zone-function can be an object defined in the dimensions of the object space that as an entry for an object point includes the degree of affiliation of that object point to the respective zone. The definition of zone-functions as an object in object space allows projecting the zone (here the zone-function) onto any object by matrix multiplication.

Another comparison of reconstructed functional images from multimodal reconstruction and conventional reconstruction is shown in FIG. 9. Functional image 84 is a multimodal reconstructed image of the upper body, for which the separation into zones was discussed before in connection with FIG. 8. Functional image 86 is a reconstruction based on the same image data using Flash 3D reconstruction. The multimodal reconstructed functional image 84 shows an increased image quality and identifies, for example, structural features, such as the decreased signal area 88, that are not resolved in the Flash 3D functional image 86.

Zonal Image Object

Based on the zonal-information, one can prepare zonal image objects. Only the object points within the zone corresponding to the zonal image object contribute to the reconstruction of the image object. During the reconstruction, the values of object points outside the zone do not contribute to the reconstruction of the zonal image object. Such values are constrained to be zero because one assumes that those object points do not generate any detected signal.

As an example for restricting the contribution of the zonal image object to its zone, one can define a zone-function $z(r)$ that assigns values greater than zero to all object points at least partly affiliated with the respective zone. For example, in an object representing the zone-function, one can assign the value 1 to object points having a $\mu$-value within a predefined range of $\mu$-values and a value of 0 to object points outside that range. To allow a smooth transition between zones, the zone-function can have values between 0 and 1 for border object points. For example, one can assign a ramp of width $\delta\mu$ at a limiting $\mu$-value in which the zone-function reduces from the value of 1 to the value 0.

Multiplication of any object in object space with a zone-function restricts the entries of the object to be non-zero only at object points that are affiliated with the respective zone. In case that during the reconstruction also object points outside the zone get assigned with non-zero values, a repeated multiplication with the zone-function may become necessary to set those values to 0.

The separation of the object space in multiple zones can be appropriate if, for example, a radioactive substance is known to accumulate in different tissue types with a different density, or when different biomarkers attach to different organs. In such cases, one can separate the object space considering the various tissue types.

The generation of zonal information from the support information (e.g. CT - or MR images) is performed by first identifying features of the examined object that relate to the functional measurement and then identifying the object points having the respective feature. In general, the areas defined by the zones abut each other. However, as discussed before one can allow smooth transitions between zones.

Mathematical Treatment of Zonal Image Objects

To consider multiple zones (e.g. N zones) in a mathematical description, one can define an image object $I_\alpha$ giving the functional activity density of the complete object space is a sum over N zonal image objects $\psi_\alpha^{(n)}$, (n=0, . . . , N-1), each representing a functional image of a zone, wherein each zonal image object $\psi_\alpha^{(n)}$ is multiplied by a respective structural zone-function $z_\alpha^{(n)}$ $$I_\alpha = \sum_n z_\alpha^{(n)} \psi_\alpha^{(n)}.$$

As mentioned above, the zone-function can be purely spatial and define the geometry of a zone in three spatial dimensions. However, the zone-function can also be spatio-temporal. In general, the index α can stand for all variables that characterize the functional activity. For example, in nuclear imaging, α can stand for the spatial coordinates of an object point, the time at which a photon has been detected, and the energy of the detected photon. α is usually discretized into 3D voxels and time and energy bins. Often, one refers to α generically as a "voxel," although it can have additional time and energy components.

The functional zonal image objects $\psi_\alpha^{(n)}$ are to be determined from the multimodal reconstruction such that each zonal image object $\psi_\alpha^{(n)}$ represents the functional activity in the respective zone as well as possible. The structural zone-functions $z_\alpha^{(n)}$, on the other hand, are predetermined from the support modality 5 and are generally not modified in the reconstruction. The zone-functions $z_\alpha^{(n)}$ designate the position and form of the zones (as functions of time and energy) and satisfy the condition $$\sum_n z_\alpha^{(n)} \leq 1 \ \forall \ \alpha.$$

Most voxels belong to no more than one zone. So for most object points α, $z_\alpha^{(n)}=1$ for some n, and all other zone-functions vanish, $z_\alpha^{(n'\neq n)}=0$. As zones can overlap, border voxels in the area of overlap between zones may be attributed to more than one zone, so there can be several values of n for which $z_\alpha^{(n)}<1$. Zones can also taper off gradually at the edges of the examined object or at an interface with an implant, which like the outside of the patient does not have any functional activity and can like the outside be considered as a Null zone. For border voxels that overlap with a Null zone, the contribution of a voxel can be less than 1, i.e., the sum $$\sum_n z_\alpha^{(n)} \leq 1$$

can be less than 1.

Co-Registration

A special registration between the support information and the object space of the nuclear measurement is required to accurately assign the object points in the object space of the functional imaging device 3 to their respective zone(s). The registration can be performed with a pre-reconstruction of the functional measurement and/or based on a known or predetermined geometrical relation between the FOV of the functional imaging device 3 and the source of support information 4. As an example for a structural image object, an anatomical CT image (and thereby, the attenuation map for the determination of the zones) can be co-registered with a preliminarily reconstructed functional image object. The co-registration of the structural and functional image object can be performed in a manner similar to the co-registration used for overlaying the separately reconstructed functional and structural images described above for the conventional analysis of functional images.

Multizone Reconstruction

In general, the reconstruction is performed using the signal associated to a zone as an additional parameter, e.g., an additional constraint, while the spatio-temporal structure of the zones is preserved. Methods to provide zone-specific constraints include performing specific measurements, estimating the constraints based on imaging data, or providing predetermined constraints in a medical database, which contains information about the constraint, e.g., for various diseases, radioactive materials, biomarkers, and patient parameters such as age, sex, height, and weight. In nuclear imaging, predetermined uptake expected for a zone (herein also referred to as fractions) can also be used as a constraint for the zones.

To measure the zone-specific constraints, one can perform an unconstrained pre-reconstruction of the image data and determine, thereby, e.g., the fractions directly from the uptakes measured in a zone. Determining the fractions from the image data is less susceptible to deviants than reading values from a database that may not always be appropriate for the current nuclear measurement. However, the values for the fractions of the uptake depend on the quality of the pre-reconstruction and an error in the constraints may propagate into the multimodal reconstruction.

Another method of determining constraints includes assigning to each zone a value $c_n$ constant for all object points and performing an optimization process based on a merit function (such as Poisson maximum-likelihood, Mighell's modified chi-square gamma) that optimizes the coefficients $c_n$ that represent the constraint (e.g. the relative uptake). This optimization is referred to herein as renormalization and is described below in detail.

High Resolution Reconstruction

The zonal reconstruction allows one to transfer the benefits of high-resolution of structural imaging technique to functional imaging techniques, thereby increasing, for example, the resolution of the functional images. In addition or alternatively to the increased resolution, one may be able to perform functional imaging with lower signal. For nuclear imaging, this can allow imaging with lower count rates with the benefit of a lower radiation dose for the patient. Similarly, in fMRI the amount of administered contrast agent may be reduced.

Exemplary Algorithms for Multimodal Reconstruction

FIGS. 10-19 show additional flowcharts of unizone and multizone multimodal algorithms.

Figure 10:
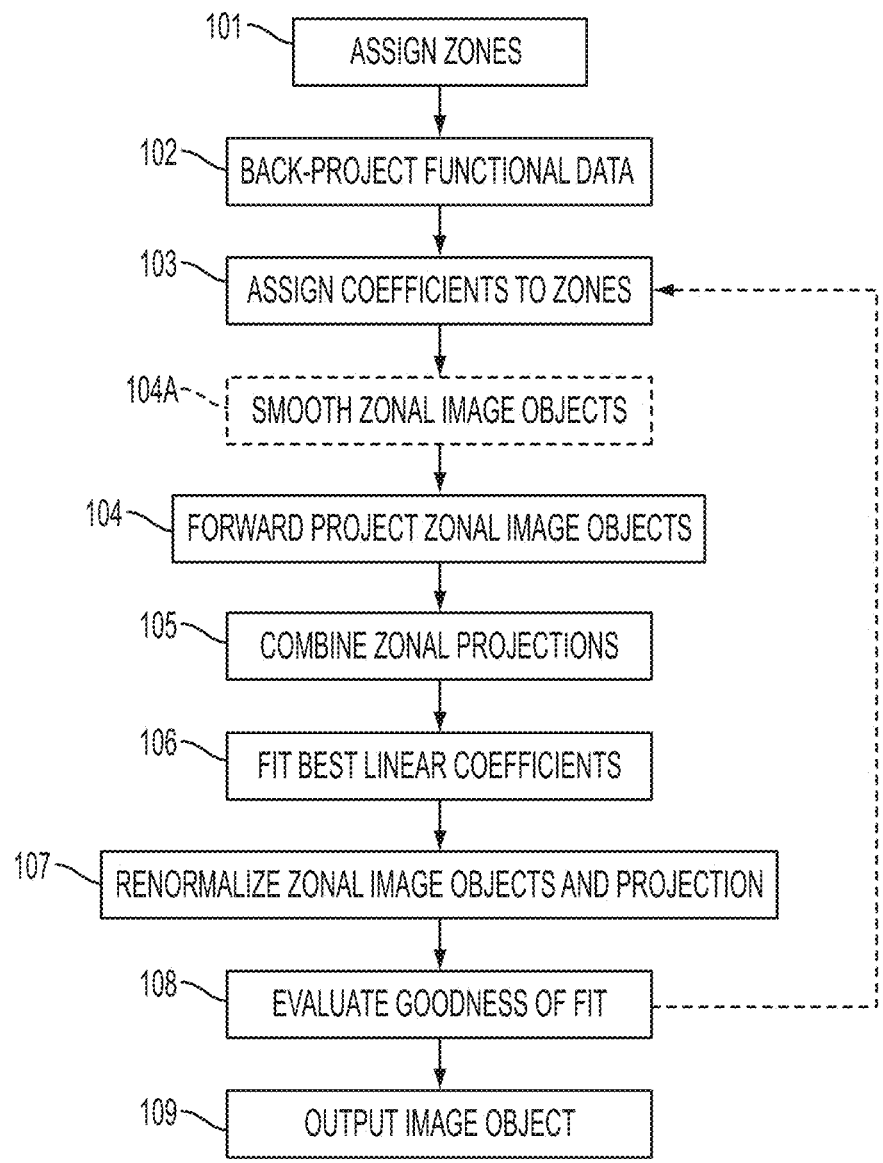
FIG. 10 is a flowchart illustrating multimodal reconstruction with and without zonal smoothing.

Referring to FIG. 10, a multimodal reconstruction can, exemplary for nuclear imaging, include the steps of assigning the zones to the object space (step 100), reading functional image data (step 101), back-projecting the image data and generating zonal image objects (step 102), assigning linear coefficients (zonal emission fractions) to the zones (step 103), forward projecting each zone separately and generating zonal projections, i.e., zonal data models, (step 104), calculating a total projection, i.e., a complete data model, as a linear combination of the zonal projections (step 105), performing a fit to derive the best linear coefficients (step 106), renormalizing the zonal emission and the zonal projection by the new linear coefficient (step 107), and checking for goodness-of-fit of the reconstruction (step 108). If necessary, one returns to step 102, i.e., the steps 102-108 are repeated until a sufficient goodness-of-fit as achieved or a maximal number of iterations is reached. At the end, the reconstructed image is output (step 109).

In the flowchart of FIG. 10, not every step does necessarily be performed or the order of steps may very. For example, the zones are usually only assigned once at the beginning of the multimodal reconstruction and the coefficients may be assigned immediately after assigning the zones.

Smoothed Zonal Reconstruction

Introducing zones enables further smoothing of a zonal image object (step 104A of FIG. 10). The smoothing operation is performed zone-specific, as explained generally in connection with FIG. 17. As an example, pixon smoothing can be applied in a zone-specific way as explained in connection with FIG. 18. For pixon smoothing, the flowchart of FIG. 10 can include the additional step of generating (and eventually updating) zonal pixon maps that provide zone-specific pixon kernel functions to the pixon smoothing operation.

Mathematical Description of Multimodal Reconstruction

Figure 11:
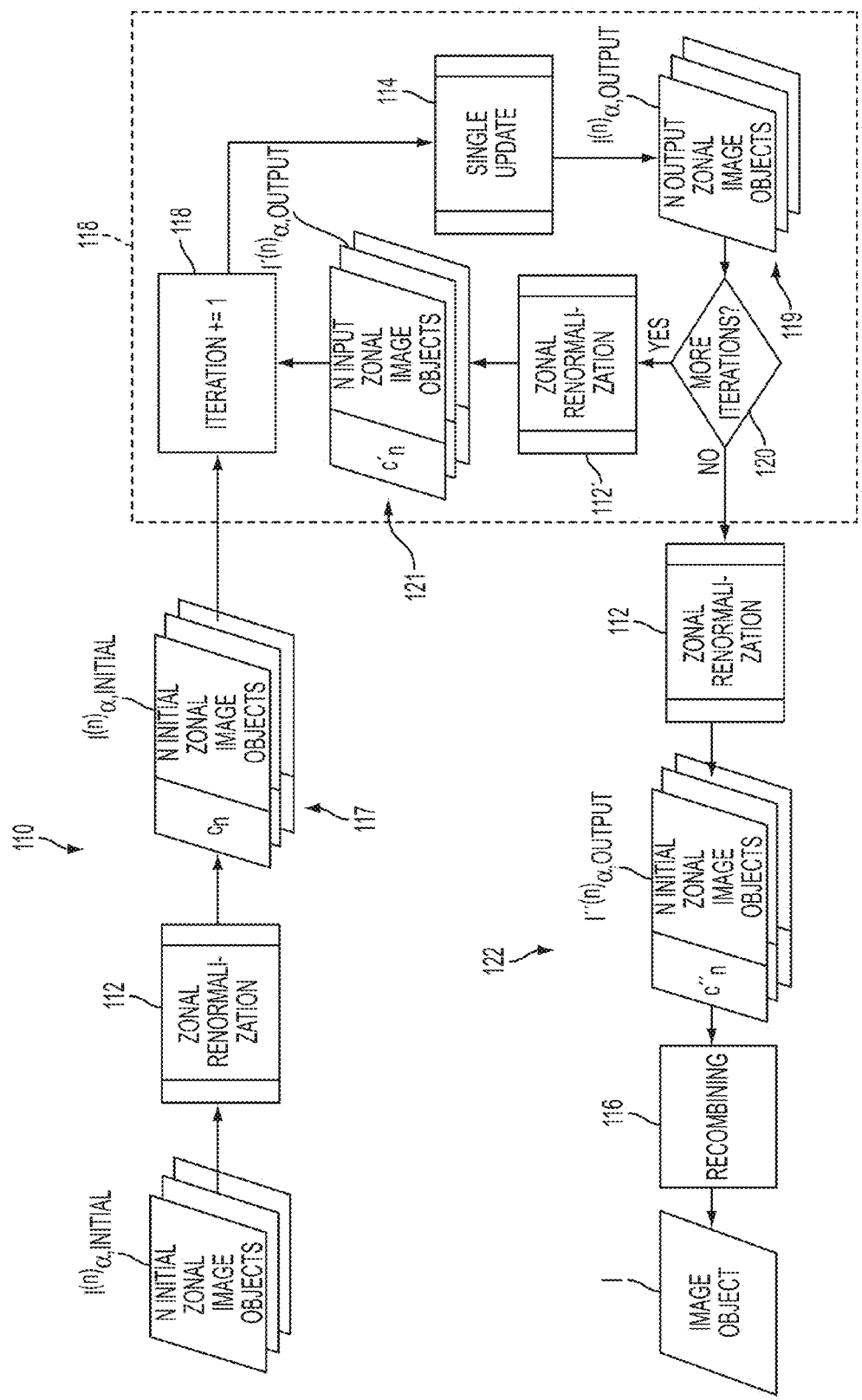
FIG. 11 is a flowchart illustrating a multimodal reconstruction algorithm for an object space separated in multiple zones.

In the following, a mathematical description for specific algorithmic features is given for multizone multimodal reconstruction. FIG. 11 shows an overview of a multizone multimodal reconstruction algorithm 110 that includes zonal renormalization operations (steps 112, 112', 112"), an update operation (step 114), and a recombining operation (step 116).

In functional imaging, image reconstruction estimates a best value for each object point to resemble the functional activity density as accurately as possible. The image reconstruction is based on the measured image data D and a data model m derived from a reconstructed image object with the help of a system matrix H and a merit function. The zonal renormalization operations (steps 112, 112', 112") and the update operation (step 114) can perform a comparison of the measured image data D and a data model m and then use the system matrix H to transform the image object from object space to a data model in data space.

The algorithm begins with a set of N initial zonal image objects $I_{\alpha,initial}^{(n)}$, each having the dimension of the final reconstructed image object. The initial zonal image objects $I_{\alpha,initial}^{(n)}$ can be derived from the functional image data by a first back projection that creates a first estimated image object and applying zonal information (e.g., multiplying a first estimated image object with zonal functions). Alternatively, the zonal image objects can be initialized arbitrary; for example, one can set all initial zonal image objects identically to unity. The renormalization operation (steps 122) generates an initial (iteration) input object 117 comprising those initial zonal image objects $I_{\alpha,initial}^{(n)}$ for each zone. In addition, the initial input object 117 comprises an initial scaling factor $c_n$ for each zone and therefore, fore each initial zonal image object $I_{\alpha,initial}^{(n)}$. The scaling factors $c_n$ constitute a zone-specific constraint for the reconstruction. In one example, a scaling factor corresponds to an initial estimate of the fraction of the signal uptake in its particular zone.

The update operation (step 114) is the repeated step in an iterative reconstruction loop 118 characterized by an index iteration that is increased for each new iteration step. For each iteration, the output of the update operation (step 114) is an output object 119 of updated output zonal image objects $I_{\alpha,output}^{(n)}$. These output zonal image objects $I_{\alpha,output}^{(n)}$ usually include a modification for each object point with respect to the initial zonal image objects $I_{\alpha,initial}^{(n)}$. The update operation (step 114) does not modify the scaling factor $c_n$.

The iterative reconstruction loop 118 includes a decision operation (step 120) that evaluates whether another iteration step needs to be performed or not.

If another iteration step is performed, then the output object 119 can be used to update the initial scaling factor $c_n$ by the renormalization operation (steps 112'), thereby providing an updated scaling factor $c'_n$. Together, the updated scaling factor $c'_n$ and the updated zonal output object $I_{\alpha,output}^{(n)}$ act as a next input object 121 for the subsequent iteration step.

If the evaluation determines that the iterative reconstruction 118 can be ended, the scaling factor $c'_n$ can be updated a last time to generate scaling factor $c''_n$. One can thus perform a last renormalization operation (steps 112") based on the zonal image objects $I_{\alpha,output}^{(n)}$ of the last output object 119, or of any previously determined output object. The output zonal image objects of the selected last output object and the scaling factors $c''_n$ form the final output object 122 from which the recombining operation (step 116) derives the reconstructed image object I Object Space, Data Space, and System Matrix During the multizone multimodal reconstruction, a zonal forward projection operation between object space and data space generates, for example, a data model m of an image object. Specifically, zonal forward projection operations are used within the algorithm for evaluating the zonal image objects or for calculating parameters of the update operation (step 114).

In image reconstruction, object space and data space are related to each other through the system matrix H of the functional imaging system 4. Thus, for any projection operation, one can use the system matrix H and its transpose $H^T$ to transform objects between object space and data space.

In general, a forward projection is an application of the system matrix H to an object in object space. The result of a forward projection is a "projected object" in data space. As an example in nuclear imaging, a forward projection is the linear operation that transforms the functional activity density into the total data model $m_i$ of predicted detection events $$m_i = \sum_\alpha H_{i\alpha} I_\alpha.$$

Here, i stands for the 2D detection positions on the detector system of the functional imaging system 4, as well as for the detection time t' and energy E'. In general, the detection time and energy of a photon does not need not be the same as the emission time t and energy E. Such cases arise, for example, in PET with time-of-flight corrections, or when the photon energy is changed in a scattering event. In many cases, however, these differences can be ignored, and t'=t and/or E'=E. A photo peak energy window may then include scattered photons, whose estimated contributions $s_i$ can be estimated separately. A data model $m_i$ based on a forward projection and scatter correction then can then be written as $$m_i = \sum_\alpha H_{i\alpha} I_\alpha + s_i.$$

The system matrix H is rarely applied directly as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} m_i$$

The transpose $H^T$ is also rarely applied as a matrix multiplication. Instead, it is represented as a product of operators:

$$H^T = H_1^T \otimes H_2^T \otimes \ldots \otimes H_n^T$$

In the multizone multimodal algorithm, one uses forward and backward projections. One example for a backward projection that has been mentioned before is the generation of the first estimated image object for the initial zonal image objects. Also an ordered-subset-expectation-maximization (OSEM) algorithm uses a forward projection to generate the data model, which is then used to derive update factors in data space. Those update factors are then back projected to generate an update object in object space that is used to update the input object. An algorithm based on a non-negative least-squares (NNLS) algorithm uses a forward projection also to generate the data model. Backward projections are used when determining an auxiliary gradient, specifically, when calculating the preliminary auxiliary gradient and the pre-conditioner object.

Zonal Forward Projection

When reconstructing multiple zones, the input object for a zonal forward projection operation comprises more than one zonal input object.

A zonal forward projection is adapted to the multizone situation and includes a forward operation, applied separately to each zonal image object of each zone. The zonal forward projection considers, thereby, the contribution of each zone to the image model. Specifically, the zonal forward projection uses the zone-functions $z_\alpha^{(n)}$ to represent the zone-specific contribution. Any stray values that the zonal image object may have received at object points outside its specific zone due to the update operation (step 124) are multiplied, e.g., by zero according to the specific definition of each zone-function. Thus, based on resulting zonal data models $m_i^{(n)}$ $$m_i^{(n)} = \sum_\alpha H_{i\alpha} z_\alpha^{(n)} \psi_\alpha^{(n)} \ \forall\, n,$$

one can write the total data model $m_i$ as a sum of the zonal data models, plus a scatter estimate $$m_i = \sum_n m_i^{(n)} + s_i.$$

Figure 12:
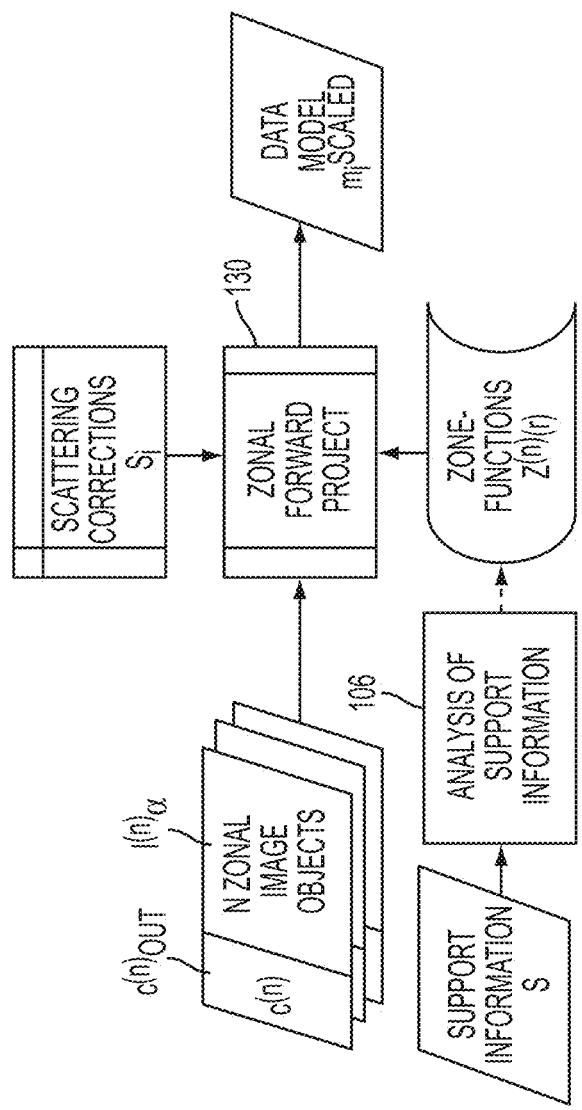
FIG. 12 is a flowchart illustrating an example of a forward projection as used in the multimodal reconstruction of FIG. 11.

As indicated in the flowchart of FIG. 12, a zonal forward projection (step 130) considers the zone-functions $z_\alpha^{(n)}$, the scattering corrections $s_i$, and the scaling factors $c_n$ when determining a scaled data model $m_i^{scaled}$. The scaling factors $c_n$ include as the zone-specific constraints, e.g., the fractional contribution of each zone to the final image object. The scaling of the zonal images with the scaling factors $c_n$ transforms into scaling the zonal data models with the same zone-specific scaling factor $c_n$.

Zonal Renormalization

In FIG. 11, the zonal renormalization process (steps 122, 122', 122") is applied at multiple positions within the iterative reconstruction algorithm 110. However, the renormalization does not need to be performed at every position indicated or for every iteration step.

Figure 13:
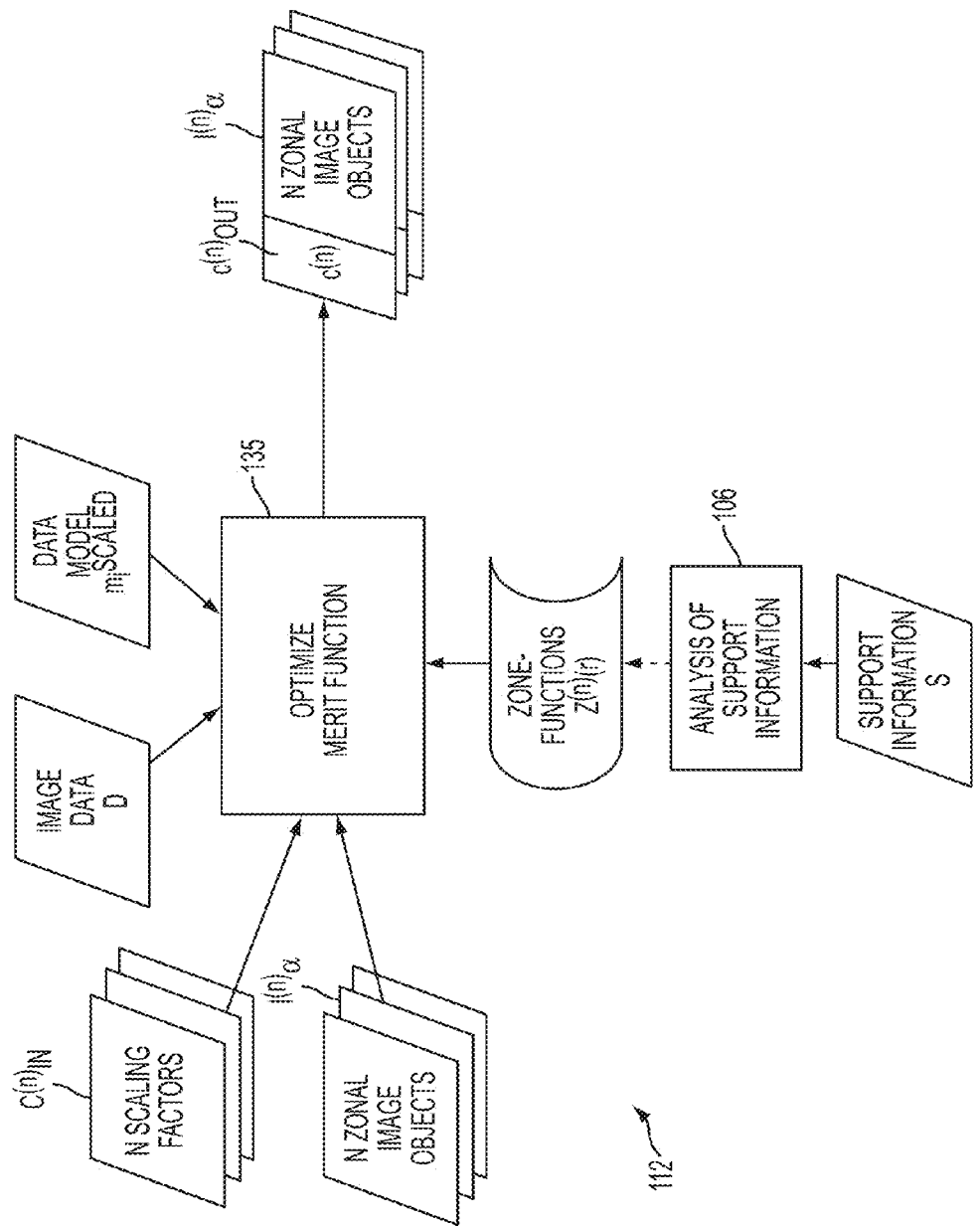
FIG. 13 is a flowchart illustrating renormalization as used in the multimodal reconstruction of FIG. 11.

As illustrated in FIG. 13, the renormalization can be based on a calculation and optimization of the merit function (step 135), which usually requires the image data D, the zonal image objects $I_\alpha^{(n)}$, their corresponding scaled data model $m_i^{scaled}$, the zone-functions $z^{(n)}(\alpha)$, and the respective scaling factors $c_n$, which are the parameters to be optimized.

The forward projection operation as described above is the basis for the calculation of a total scaled data model $m_i^{scaled}$ as will be described below. The zone-functions $z_\alpha^{(n)}$ are derived by analyzing the support information S. The zonal image objects $I_\alpha^{(n)}$ can be the constant initial zonal image objects or any updated zonal image objects calculated by the update operation (step 124).

One optimizes the merit function for the scaling factors $c_n$, which in general is a optimization of only few parameters, i.e., of the N scaling factors $c_n$. The number N of zones into which the object space is usually separated is in the range from 2 to about 50, for example, 3, 4, 5, 10, 15, 20, 25, 30. The output of the zonal renormalization process (step 122, 122', 122") includes an optimized scaling factor $c'_n$ for each zonal image objects $I_\alpha^{(n)}$.

The influence of the scaling factors $c_n$ on the data model is explained below. Scaling of the zonal image objects $I_\alpha^{(n)}$ with the non-negative scaling factors $c_n$ $$\psi_\alpha^{(n)} \to c_n \psi_\alpha^{(n)} \ c_n \geq 0 \ \forall n$$

leads to corresponding scaling of the zonal data models $m_i^{(n)}$ $$m_i^{(n)} \to c_n m_i^{(n)} \ \forall n.$$

The scaled total data model $m_i^{scaled}$ as generated by the zonal forward projection 130 (including scaling and scattering correction) is given by modifying the sum in $$m_i = \sum_n m_i^{(n)} + s_i,$$

as follows:

$$m_i^{scaled} = \sum_n c_n m_i^{(n)} + s_i.$$

During the zonal renormalization operation, the scaling factors $c_n$ are chosen to minimize a merit function of the data D given the total data model $m_i^{scaled}$. For example, one can use a modified chi-square-gamma statistic as described in K. J. Mighell, "Parameter estimation in astronomy with Poisson-distributed data. I. The $\chi_\gamma^2$ statistic," Astrophys. J., 1999, 518: 380-393 and K. J. Mighell. "Parameter estimation in astronomy with Poisson-distributed data. II. The modified chi-square gamma statistic", 2000, arXiv:astro-ph/0007328, the contents of which are herein incorporated by reference.

The chi-square-gamma statistic of Mighell is defined by:

$$\chi_\gamma^2 = \sum_{j=1}^{J} \frac{(d_j + \text{Min}\{d_j, 1\} - m_j)^2}{d_j + 1},$$

wherein $d_j$ and $m_j$ are the j-th entries of the measured data set D and the data model m, respectively. J is the number of data points in data space, i.e., the number of data points in the data set D.

Mighell's modified chi-square-gamma statistic is unbiased and well behaved for low counts. It also has the advantage that it is quadratic in the optimization parameters, so setting its gradient to zero results in linear equations for them, albeit constrained to non-negative $c_n$.

An alternative merit function is the log-likelihood function $$\mathcal{L} = 2\sum_i [m_i^* - d_i \text{Ln}(m_i^*)],$$

but as the log-likelihood function is not well behaved at low counts, it should be used with caution.

Renormalization of the constant initial objects (with value 1 for all α) retains constant initial zonal images $I_{\alpha,initial}^{(n)}$ that vary from zone to zone according to their scaling factors. In FIG. 11, the zonal image objects $I_\alpha^{(n)}$ and the scaling factors $c_n$ are shown as parts of the input objects 117, 121, and the output object 122. However, one can similarly provide only renormalized zone-functions to the iteration loop, e.g. by substituting $I_\alpha^{(n)}$ with $c_n I_\alpha^{(n)}$. For the initial zonal image object one would then set $I_\alpha^{(n)} \equiv c_n$. Those scaled zonal image objects are also updated whenever updated scaling factors are available.

Performing the combining operation (step 116) on the initial zonal image object results in an image object I that is piecewise constant, with intermediate values at zone boundaries $$I_\alpha = \sum_n c_n z_\alpha^{(n)}.$$

Returning to FIGS. 11 and 13, zonal renormalization operations (step 122', 122") during the iterative reconstruction operation (step 124) update the scaling factors in view of improved zonal image objects. Thus, those zonal renormalization operations (step 122', 122") allow the constraints for the different zones to change from one iteration to the next. This update of the constraints may reduce or avoid serious artifacts, which could be generated otherwise. Usually, the scaling factors do not change much after several iterations.

Iterative Reconstruction

Iterative reconstruction allows the zonal image objects to vary spatially. The update operation of the reconstruction proceeds much as in a conventional "unimodal" reconstruction, except that the scaled total data model $m_i^{scaled}$ is used and that zonal renormalization can be performed before zonal image objects are forward projected.

In maximum-likelihood-expectation-maximization (MLEM) algorithms such as OSEM reconstructions, the zonal image objects are updated with each iteration by a multiplicative update object $$I_{\alpha,out}^{(n)} \rightarrow \frac{\sum_i H_{i\alpha} d_i / m_i^{scaled}}{\sum_i H_{i\alpha}} I_{\alpha,in}^{(n)}$$

obtained by back-projecting the data update factors $d_i/m_i^{scaled}$. The update objects depends on α but not on n. Additionally, MLEM and OSEM are derived from the log-likelihood function and are also sensitive to projected pixels with low counts, as mentioned above for the renormalization.

OSEM

Figure 14:
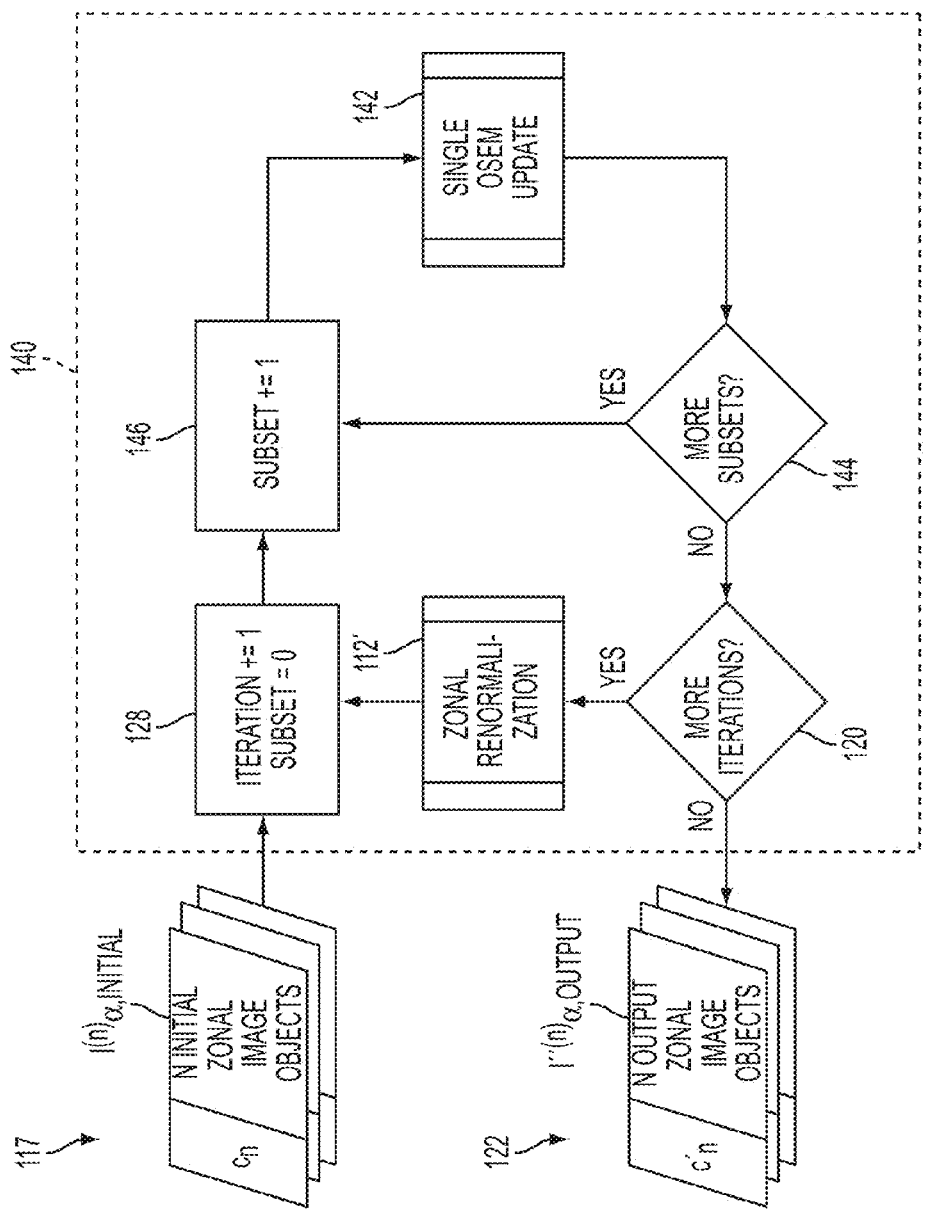
FIG. 14 is a flowchart illustrating a zonal OSEM reconstruction algorithm.

FIG. 14 illustrates an iteration loop 140 for OSEM. A single OSEM update 142 is performed for each subset as indicated by the evaluation of the number of subsets (step 144) and an increase of the index subset (step 146). An iteration step of the algorithm is completed when all subsets have been updated.

The iteration loop 140 further includes the decision operation (step 120) that evaluates whether another iteration step needs to be performed. For each new iteration, the algorithm increments an index iteration (step 128).

If another step needs to be performed, the renormalization operation (steps 122'), can generate new scaling factors $c'_n$ that (as part of the updated output object) are provided to the next loop over all subsets of the iteration.

If the evaluation determines that the iterative reconstruction can be ended, the reconstructed image I is generated from the zonal image objects of usually the last output object 122, with or without another renormalization operation.

Figure 15:
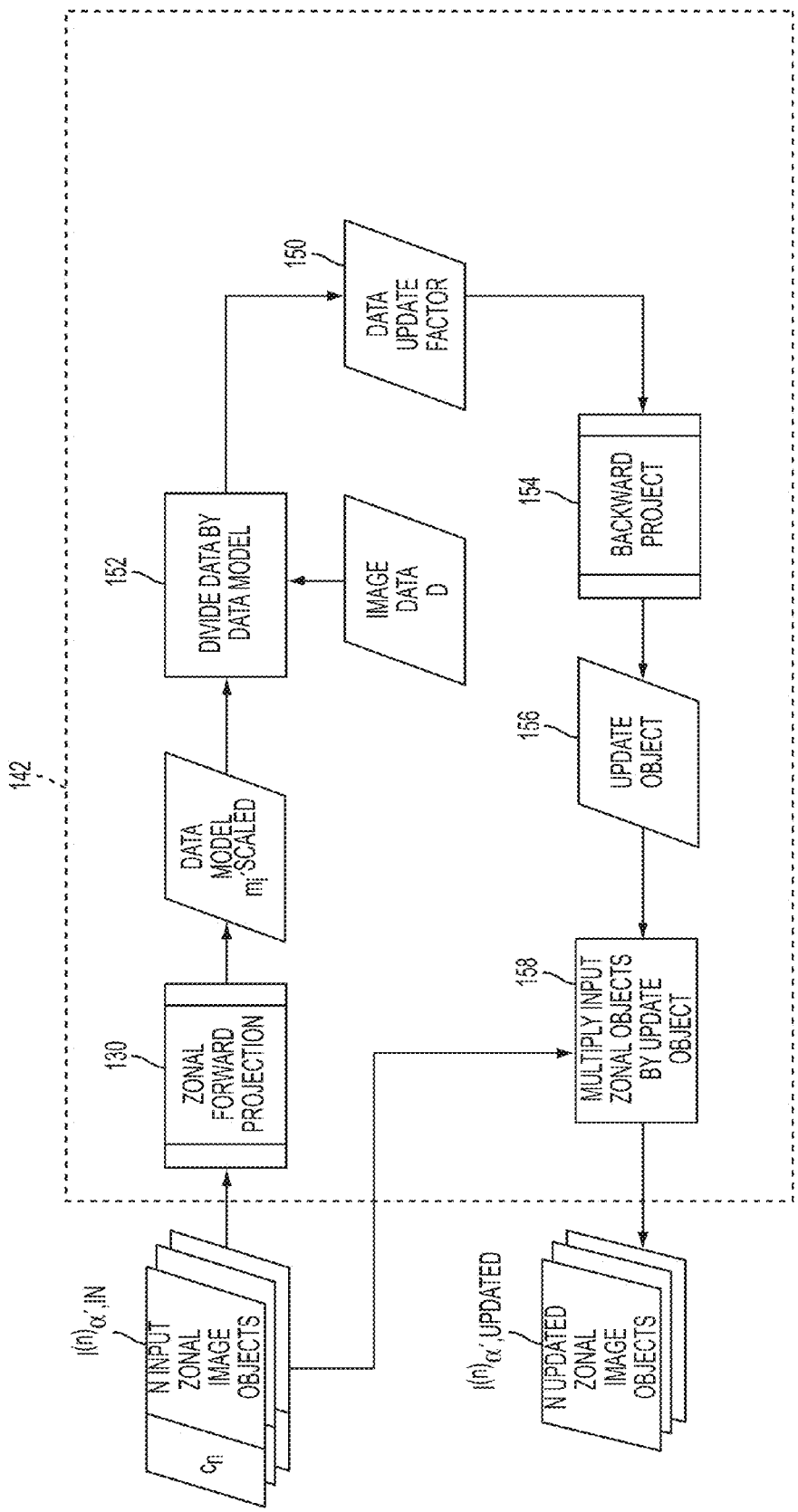
FIG. 15 is a flowchart illustrating a single zonal OSEM update operation as used in the algorithm of FIG. 14.

FIG. 15 illustrates the details of an update operation 142 for a subset (indicated by α') of object points. The zonal forward projection 130 of input zonal image objects $I^{(n)}_{\alpha',in}$ of the subset of object points generates a scaled data model $m_i^{scaled}$ for the subset. In data space, a data update factor 150 is calculated by dividing the image data by the data model (step 152). A backward projection (step 154) of the data update factor 150 yields an update object 156 in object space, which is then multiplied with each of the input zonal image objects $I(n)_{\alpha'}$ (step 158) to generate updated zonal image objects $I(n)_{\alpha', updated}$ for the subset.

Conjugate-Gradient Minimization

In non-negative least squares algorithm, the zonal image objects are updated with each iteration by an additive update object. Examples include steepest-decent and conjugate-gradient algorithms.

Figure 16:
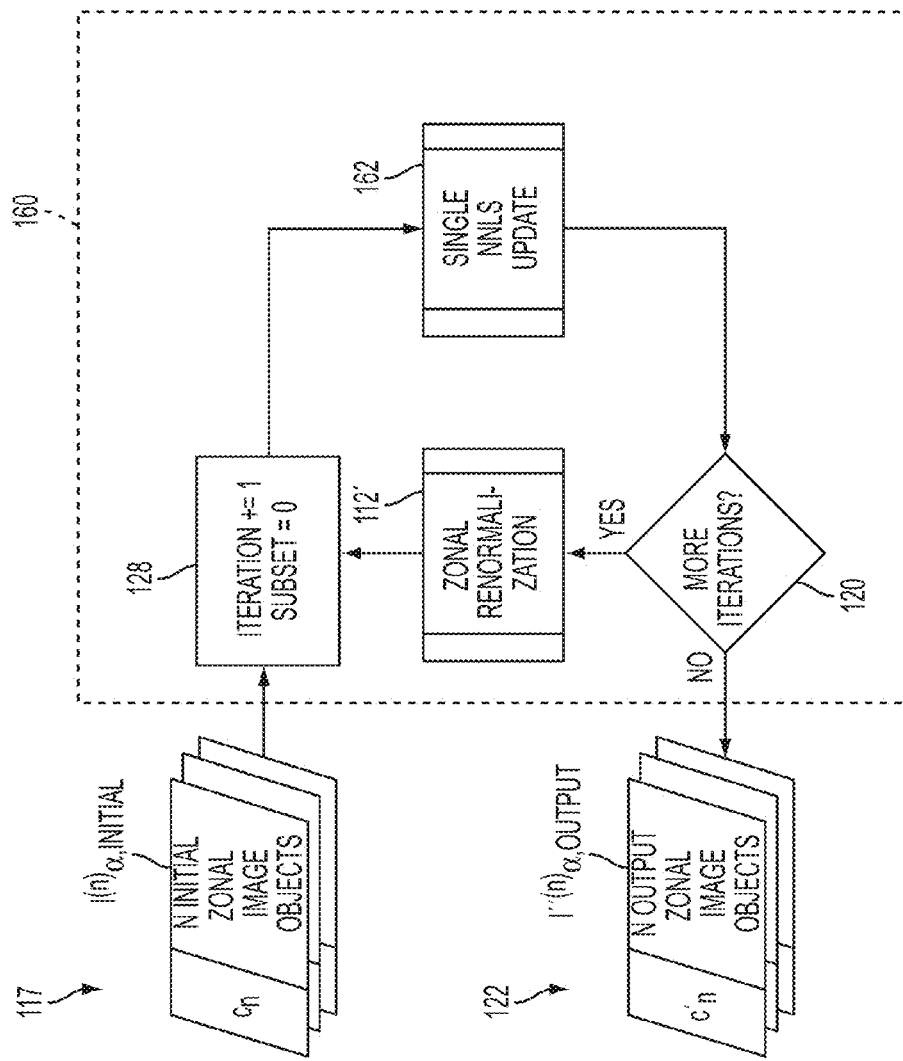
FIG. 16 is a flowchart illustrating a zonal NNLS algorithm.

Referring to FIG.16, one can use Mighell's modified chi-square-gamma statistic $\chi_\gamma^2$ for conjugate-gradient minimizations (CGM) in, for example, nuclear imaging. Such a statistic is well behaved at low counts. Within a CGM iteration loop 160, schematically shown in FIG. 16, the minimization operation 162 is performed with respect to an input image object $I_\alpha$, not the zonal image objects $I_{\alpha,in}^{(n)}$. The preconditioner $p_\alpha$ of the CGM update can be defined as $$p_\alpha = \left[\sum_i H_{i\alpha}/(d_i+1)\right]^{-1}.$$

In unimodal CGM, the image object would be updated in each iteration step by an additive $\Delta I_\alpha$ (see, e.g., R. C. Puetter et al., 2005). In multimodal reconstruction, this update is applied to each of the zonal image objects $I_{\alpha,in}^{(n)}$, i.e. $I_{\alpha,in}^{(n)}$ is replaced by $I_{\alpha,in}^{(n)} + \Delta I_\alpha$.

It is immaterial whether $\Delta I_\alpha$ is added to $I_\alpha^{(n)}$ at object points at which the zone-function $z_\alpha^{(n)}$ vanishes because the image object is a sum of the products $z_\alpha^{(n)} \psi_\alpha^{(n)}$. However, in practice one would rarely add the additive $\Delta I_\alpha$ for those object points, thereby preserving the distinction between the zones that is explicit in the zonal image objects.

Maximum a Posteriori Reconstruction Algorithm

Another class of reconstruction algorithm that can benefit from the disclosed multimodal reconstruction includes maximum a posteriori reconstruction algorithms (MAP). As most of the maximum likelihood algorithms have MAP counterpart algorithms the above introduction of zones and zonal image objects is equally applicable for MAP algorithms.

In general, multimodal reconstruction results in images that differ from those obtained by traditional reconstruction. As iterative reconstruction converges to a global minimum of a merit function, there should, in principle, be no difference between an image described by a single object and the same image described as a sum of more than one zonal image object. However, as a practical matter, iterative reconstruction usually is not carried out to convergence, both because convergence may require many iterations, each of which contributes to an accumulation of round-off errors, and because image reconstruction is an inherently ill-posed problem, as defined by Hadamard (see, e.g., J. Hadamard,. "Lectures on Cauchy's Problem in Linear Partial Differential Equations," New Haven: Yale Press. Reprinted 1952. New York: Dover. 1902, 1923). Small noise in the image data can be greatly magnified by the reconstruction. Such noise can result in artifacts in the reconstructed image object that dwarf the true signal.

In part because of the foregoing difficulties, iterative reconstruction is therefore typically stopped after a few iterations. Therefore, it is important how those few iterations are performed. Multimodal reconstruction separates the functional activity into medically meaningful zones defined by the supporting modality. This separation into zones is left largely unaltered during the iterative reconstruction.

Zonal Smoothing

In an alternative embodiment, the zonal information can be used to provide zone-specific (zonal) smoothing. For example, one can perform smoothing operations to the zonal image objects during the reconstruction. Exemplary smoothing operations include pixon smoothing, Fourier filtering, application of a Wiener filter, wavelet filtering, and/or application of a fixed filter. For such smoothing operations, the associated filter functions can be stored in a constraining map, for example, a unimode pixon map. An overview of different smoothing methods is given in R. C. Puetter et al., "Digital Image Reconstruction: Deblurring and Denoising," Annu. Rev. Astro. Astrophys., 2005, 43: 139-194.

As shown generally in FIG. 10, the smoothing 104B can act on the zonal input object or the selected updated zonal image object, which is selected to become the reconstructed image I. The pixon smoothing operation is based on a pixon map P, which can be specifically determined for each zone.

Pixon Smoothing

Pixon smoothing can be viewed as a way to average values of an object over a specific volume defined by the pixon kernel function. The smoothing operation can be written as a matrix operation using a pixon kernel operator K, such that the (smoothed) image object I is given by applying the pixon kernel operator K to a pseudo-image object $\psi'$:

$$I_\alpha = \sum_\beta K_{\alpha\beta}\psi'_\beta$$

"Pseudo" indicates that the smoothing operation can be understood as a transformation (using the pixon kernel operator K) from a (pseudo-) object space, i.e. the pre-pixon smoothing space, to the object space of the image object I. Applying the transpose operator $K^T$ of the pixon kernel operator then projects from the object space back into the pseudo-object space.

In many cases, the smoothing operation is a convolution operation given by:

$$I_\alpha = \sum_\beta K_{\alpha-\beta}\psi'_\beta$$

Convolutions can be calculated by a direct summation, for small pixon kernel functions, and by fast Fourier transforms (FFTs), for large kernel functions. If the kernel function can be factorized, a product of operators can be applied to simplify the calculation.

Kernel functions, which can be discrete or continuous, are defined over a volume that surrounds an object point. The volume can be limited (over one or more object points), it can extend over one or more zones, or it can extend over the complete object space. Examples for pixon kernel functions include a Gaussian function, an inverted paraboloid, or a function $f(x;\beta)=(1+\beta x^2)^{-1/\beta^2}$, which approximates the Gaussian and parabolic functions for β-values of zero or infinity respectively, wherein the parameter x can either represent the radius or depend on the direction.

The shapes of the kernel functions can be symmetric, or they can be adjusted in response to a form prevailing in the image object I. Within the shape of the pixon kernel functions, one can weigh the contribution of an object point. A limiting case of a pixon kernel function is the delta-function, in which the pixon smoothed object and the unsmoothed object are identical.

Pixon Map Determination

The pixon method includes a search for the broadest possible pixon kernel functions at each point in the object space that collectively support an adequate fit of an object to the measured data set D. In particular, the pixon map assigns to each object point a specific pixon kernel function. During a pixon smoothing operation, the selected pixon kernel functions are obtained from the values of the pixon map P. When applying the pixon method to data consisting of low numbers of counts, a statistic is used to statistically evaluate the effect of smoothing with a pixon kernel function during the determination of the pixon map P. Thus, such a statistical evaluation is suitable, for example, for image reconstruction of the functional imaging system 4, for which the data are Poisson distributed. Employing a statistical evaluation for the pixon map determination that coincides with a statistic of the data set D increases the accuracy of the pixon map P.

One constructs the pixon map P by iteratively considering each of the pixon kernel functions individually. Within each iteration, one calculates a goodness-of-fit for every object point of an input object $\psi'$, and evaluates the extent of the smoothing caused by the pixon kernel function associated with that iteration. The goodness-of-fit is based on a statistic that is well suited for low count data. If the calculated goodness-of-fit of an object point fulfills a preset condition, one (or more) pixon kernel functions are assigned to that object point. The information about the assigned kernel function(s) is stored in the pixon map P.

Based on the zonal information, the pixon smoothing can be performed based on a zonal pixon map providing specific pixon kernel functions for one or more zones. Additionally, or alternatively, the entries of the zonal pixon map for pixon kernel functions for the specific zones can be derived from the same or from different modalities. For example, smoothing of a zone of less interest can be smoothed, if at all, based on a pixon kernel function requiring less computational power, while a pixon kernel function of the zone of interest provides shape-specific smoothing of high quality.

For nuclear image reconstruction, pixon smoothing and the generation of a pixon map P are described in more detail, for example, in U.S. patent application Ser. No. 11/931,084, filed Oct. 31, 2007 and entitled "EXTERNAL PIXON FOR TOMOGRAPHIC IMAGE RECONSTRUCTION TECHNICAL FIELD," U.S. patent application Ser. No. 11/931,195, filed Oct. 31, 2007 and entitled "RECONSTRUCTING A TOMOGRAPHIC IMAGE," and U.S. patent application Ser. No. 11,931,030, filed Oct. 31, 2007 and entitled "DETERMINING A PIXON MAP FOR IMAGE RECONSTRUCTION," and in the co-pending U.S. patent application entitled "DETERMINING A MULTIMODAL PIXON MAP FOR TOMOGRAPIC-IMAGE RECONSTRUCTION," by A. Yahil and H. Vija, filed on even date herewith. The contents of all the preceding patent applications are incorporated herein by reference.

Intrazonal Smoothing

Multimodal reconstruction, as specified so far, separates the functional activity measured with the nuclear modality into different zones that were defined by a support modality. The reconstruction does not control how the functional activity is distributed within each structural zone. For example, if a support modality can structurally define potential zones of biomarker accumulation (e.g., lesions), multimodal reconstruction can determine in which zone there is functional activity and how much.

An additional task of functional imaging is to enable the identification of lesions that are not delineated by the structural modality. Intrazonal smoothing operations can improve the reconstruction of intrazonal activity distributions and thereby support that the above task can be achieved.

Like iterative reconstruction, intrazonal reconstruction faces an ill-posed problem in which excessive iterations can build up artifacts due to overfitting of the data. This can occur when one treats noise as signal. In the absence of information from another modality, one is forced to constrain, e.g. smooth or pixon smooth, the image based on statistical criteria applied to the functional data only. The introduction of a multiple zones allows constraining the respective zonal image objects by smoothing operations.

Figure 17:
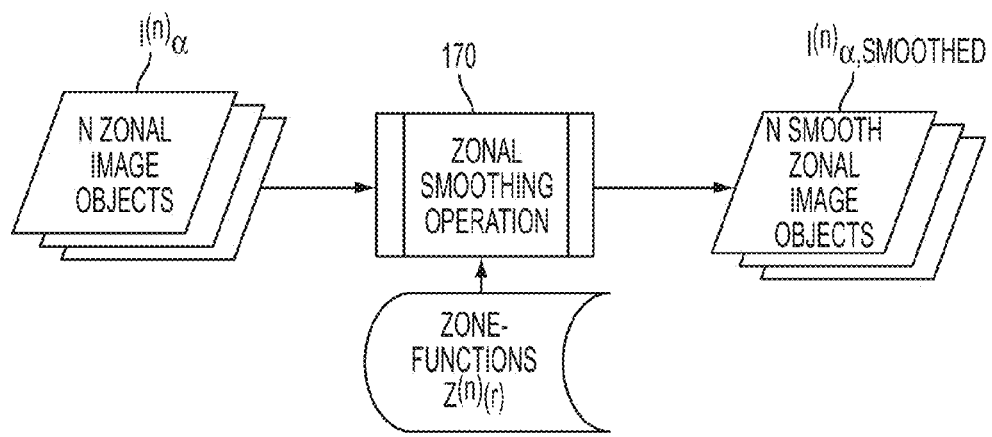
FIG. 17 is a flowchart illustrating zonal smoothing.

As shown in FIG. 17, a zonal input object $I_\alpha^{(n)}$ is subject to a zonal smoothing operation (step 170), which uses the support information (e.g., in the form of zone-functions $z_\alpha^{(n)}$) to generate smoothed zonal image objects $I_{\alpha,smooth}^{(n)}$. Applications of the zonal information include smoothing operations that only act within the zone or that generate a smoothing parameter based on object points within the respective zones. However, as zonal image objects are restricted by the zonal functions during the zonal forward projections, smoothing can in principal also be performed over the complete object space as the entries of the object points not-affiliated with the respective zone are cleared by multiplication with the zone-function.

The smoothed zonal input objects $I_{\alpha,smooth}^{(n)}$ are then used in zonal multimodal reconstruction as described above. For example, one can combine the zonal smoothing operation (step 170) with the forward operation 130 of FIG. 12. In addition, or alternatively, smoothed zonal image objects $I_{\alpha,smooth}^{(n)}$ can be recombined into a single image object.

Figure 18:
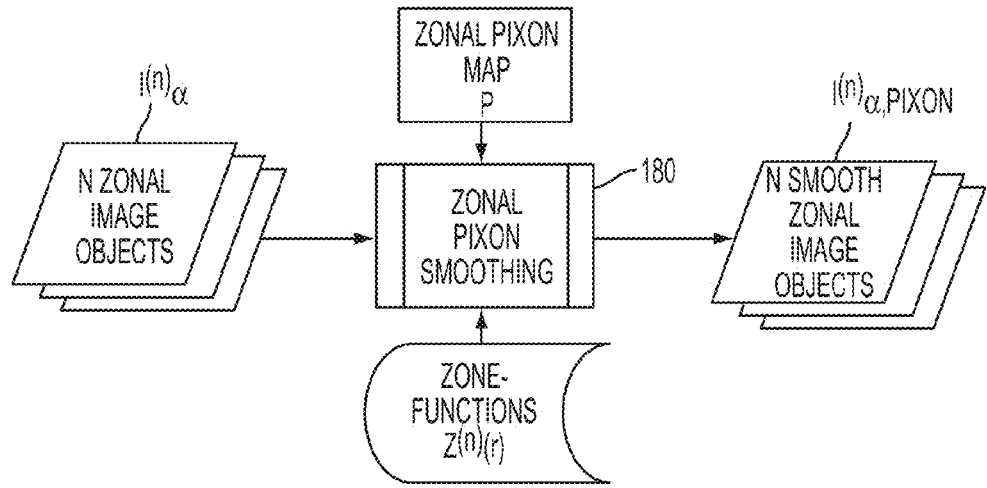
FIG. 18 is a flowchart illustrating zonal pixon smoothing.

Zonal pixon smoothing (step 180) is illustrated in FIG. 18. As described above, the pixon method restricts image objects by adaptively identifying the underlying image structures.

Specifically, the pixon method is based on a pixon map that determines the non-negative kernel functions $K_{\alpha\beta}$ that are used to smooth a pseudo object $\Psi_\alpha^{(n)}$ $$I_\alpha = \sum_\beta K_{\alpha\beta} \psi_\beta.$$

In multimodal reconstruction, image restriction can be applied separately to each zone or to a selected group of zones, thereby taking advantage of the image restriction already established by the support modality, e.g., in the form of a structural image. Zonal pixon smoothing includes smoothing each of the zonal image objects separately according to zone-specific kernel functions $K_{\alpha\beta}^{(n)}$ provided in a pixon map. A pixon smoothed image object $I_{\alpha,pixon}$ can be calculated as $$I_{\alpha,pixon} = \sum_n z_\alpha^{(n)} I_{\alpha,pixon}^{(n)},$$

where the pixon smoothed zonal image object $I_{\alpha,pixon}^{(n)}$ is determined by the zone-specific kernel functions and the zone-functions $z_\alpha^{(n)}$ according to $$I_{\alpha,pixon}^{(n)} = \sum_\beta K_{\alpha\beta}^{(n)} z_\beta^{(n)} I_\beta^{(n)} \bigg/ \sum_\beta K_{\alpha\beta}^{(n)} z_\beta^{(n)}.$$

The denominator corresponds to a pixon smoothed zone-function and provides a zone-specific normalization of the pixon smoothed zonal image object $I_{\alpha,pixon}^{(n)}$.

A number of embodiments of the invention have been described. Nevertheless, it will be understood that various modifications may be made without departing from the spirit and scope of the invention. For example, multimodal reconstruction can be applied to a wide variety of reconstruction processes, including but not limited to ML, NNLS, MAP, and Bayesian reconstruction algorithms. The zonal information can be derived from one or more support modality and complemented by manual input of parameters or zone borders. Zones can be defined to contain tissue of enhanced interest. Zones can also be defined to exclude tissue, which for example accumulates uninteresting signal. In an example, a bladder is manually excluded.

Regarding zonal smoothing, the order in which the different pixon kernel functions are used during the smoothing operation can be varied, the step size can be varied, or some pixon kernel functions may be considered only in defined areas of the image.

The pixon map can associate smoothing operations with, for example, in the order of ten spherical pixon kernel functions. If one does not want to impose symmetry, one may use additionally or alternatively elliptical pixon kernel functions. However, asymmetric pixon kernel functions may increase the computational effort, which one can handle, for example, by using specifically designed hardware.

The pixon map can be provided, for example, as a field of variables defining the pixon kernel functions or as a field of indices, which indicate kernel functions within the table F of the pixon kernel functions.

Various combinations of the multimodal reconstruction and multimodal smoothing described herein can be employed. Additionally, one may apply one or more operations between the smoothing operation and the projection if it seems appropriate. For example, one can store the unsmoothed object for a later evaluation. Moreover, one can use more than one type of smoothing operation to constrain the reconstruction.

The pixon smoothing operation may be the calculation of an average of the values of the object points within the volume defined by the corresponding pixon kernel function. The pixon smoothing within the reconstruction can be applied multiple times until the quality of a corresponding data model fulfills a stop-criterion characterizing the goodness-of-fit of a current data model.

The updated objects provided as image object may be the most recently updated object. Alternatively, it may be determined based on quality evaluation criteria. Instead of being supplied to a renderer for visualization, the output object can be supplied to a record keeping system (e.g., PACS system) or a system for automatic quantitative diagnosing.

The source of the functional signal may be an object or patient positioned within the detecting area of the functional imaging system.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A computer-implemented method of reconstructing an image object for a measured object in object space from image data in data space during a reconstruction process, the method comprising causing a computer to execute instructions for:
    providing zonal information separating the object space into at least two zones, the zonal information being derived from anatomical information of a CT or MR modality;
    providing at least two zonal image objects, each zonal image object being associated with one of the at least two zones and being from a functional imaging modality;
    reconstructing the image object using a data model derived from separately forward projecting the functional information from the functional imaging mode as each of the zonal image objects into data space, wherein the contribution of each zonal image object to the data model is weighted according to a zonal scaling factor, combining results of the separate forward projecting, and back-projecting the functional information of the image data from the combined results, the forward and back projecting of the functional information being without forward and back projecting of the anatomical information from the CT or MR modality; and
    outputting the image object,
    wherein the zonal information is used in combination with the functional information from the functional imaging modality in reconstructing the image object during the reconstruction process,
    wherein the zonal information is used to reconstruct the image object, wherein the image object is an integrated image comprising the functional and anatomical information.

2. The method of claim 1, wherein a zone includes multiple disjoint areas.

3. The method of claim 1, wherein reconstructing the image object includes combining an updated zonal image objects of one of an iteration to form the image object, wherein the contribution of each updated zonal image object to the image objected is weighted zone-specific.

4. The method of claim 1, wherein providing zonal information includes generating the zonal information by analyzing support information about at least one of an anatomical feature of the examined object, a disease specific feature, a feature specific to the application used to generate the image data, and a biomarker specific feature.

5. The method of claim 1, wherein providing zonal information includes grouping object points of the object space into a zone based on at least one of a common anatomical feature, a common application specific feature, a common disease specific feature, a common biomarker specific feature of the object points to provide a geometrical area within the object.

6. The method of claim 1, wherein providing zonal information includes providing a zone-function relating object points of the object space to a zone.

7. The method of claim 6, wherein a value of the zone-function at an object point corresponds to a level of affiliation of that object point with the zone.

8. The method of claim 1, wherein forward projecting a zonal image object includes multiplying the object points of the at least one zonal image object by the respective value of a zone-function.

9. The method of claim 1, wherein zonal information is defined based on values of an attenuation map derived from a computer tomography image of the examined object.

10. The method of claim 1, wherein reconstructing the image object includes:
    performing an iterative reconstruction of the image object, wherein the iterative reconstruction comprises a series of iterations, each iteration of which includes forward projecting the zonal image objects, thereby generating zonal data models;
    combining the zonal data models to form the data model in data space;
    determining an update object in object space based on the data model and the image data; and
    updating the zonal image objects with the update object, thereby generating at least two updated zonal image objects.

11. The method of claim 10, wherein combining the zonal data models to form the data model includes a correction of the zonal data model by a scattering correction term.

12. The method of claim 10, wherein combining the zonal data models to form the data model includes a summation over the zonal data models or over scatter corrected zonal models for multiple zones.

13. The method of claim 10, wherein the update object comprises object-point specific update factors and wherein reconstructing the image object includes multiplying, for each object point of a zone, an entry of the respective zonal image object by the respective update factor.

14. The method of claim 1, wherein reconstructing the image object includes determining the zone-specific scaling factors.

15. The method of claim 1, wherein reconstructing the image object includes receiving the zonal scaling factors from a medical database that includes scaling factors in dependence of at least one of tissue type, disease, patient parameters such as age, size, or weight.

16. The method of claim 1, wherein reconstructing the image object includes deriving the zonal scaling factors from a renormalization operation.

17. The method of claim 16, wherein the renormalization operation includes determining a merit function of a modified Chi-square gamma statistic or a Log-likelihood function to optimize the scaling factors for given zonal image objects.

18. The method of claim 1, wherein an update object comprises object point specific update additives and wherein reconstructing the image object includes adding, for each object point of a zone, an entry of the respective zonal image object and the respective update additive.

19. The method of claim 1, wherein reconstructing the image object includes zonal smoothing of at least one of the zonal image objects.

20. The method of claim 1, wherein reconstructing comprises optimizing, smoothing, or optimizing and smoothing based on the zonal information.

21. The method of claim 1, wherein the zones do not modify a merit function of the reconstructing.

22. A method of multimodal imaging of an examined object during a reconstruction process, the method comprising:
performing a support imaging operation of the examined object with a CT or MR modality, thereby generating support information;
identifying at least two zones in the examined object based on the support information, wherein identifying comprises identifying as a function of a disease specific feature, an application specific feature, a biomarker specific feature, or combinations thereof;
performing, with a functional imaging modality, a functional imaging operation of the examined object by detecting the functional signal;
generating image data from the functional signal;
reconstructing an image object from the image data under the consideration that portions of the functional signal are associated with the zones, wherein the reconstructing includes separately forward projecting the functional signal and not the support information from the CT or MR modality, combining results from the separate forward projecting, and back-projecting the combined results as the functional signal and not the support information from the CT or MR modality; and
outputting the image object,
wherein the at least two zones is derived from the CT or MR modality and is used in combination with the functional imaging modality in reconstructing the image object during the reconstruction process,
wherein the zonal information is used to reconstruct the image object, wherein the image object is an integrated image comprising functional and anatomical information.

23. The method of claim 22, wherein reconstructing comprises providing at least two zonal image objects that correspond to the at least two zones and scaling the zonal image objects according to their portions.

24. A functional imaging device for performing zonal imaging during a reconstruction process comprising:
a detector unit for detecting a functional signal from a measured object within a detecting area and providing image data in data space indicative of the detected signal; and
a reconstruction unit for reconstructing an image object in object space from the image data, the reconstructing unit configured to;
receive zonal information from a CT or MR modality separating the object space of the functional signal into at least two zones;
reconstruct an image object from the image data under the consideration that portions of the functional signal are associated with the zones, wherein the reconstruction includes separately forward projecting the functional signal and not the anatomical information from the CT or MR modality, combining results from the separate forward projecting, and back-projecting the combined results as the functional signal and not the anatomical information from the CT or MR modality; and
provide the image object at an output of the reconstruction unit,
wherein the zonal information is used to reconstruct the image object, wherein the image object is an integrated image comprising functional and anatomical information.

25. The functional imaging device of claim 24, further comprising an input device and a display device, and wherein the reconstruction unit is further configured:
to receive support information;
to display the support information on the display device to a user; and
to derive the zonal information from the support information and input from the user.

26. The functional imaging device of claim 24, further comprising a support imaging device for deriving support information about the measured object, and wherein the reconstruction unit is further configured to receive the support information from the support imaging device.

27. A method of multimodal imaging of an examined object during a reconstruction process, the method comprising:
deriving zonal information from disease specific feature, application specific feature, a biomarker specific feature, or combinations thereof;
acquiring, with a structural imaging modality, structural information as a function of the zonal information, the structural information being in at least first and second zones, the first zone different than the second zone;
generating, with a reconstruction unit, first and second zonal image objects from functional information and the first and second zones, the zonal image objects being of the functional information and not of the structural information;
reconstructing, with the reconstruction unit, an image object from the first and second zonal image objects, the reconstructing including:
forward projecting, separately, the first and second zonal image objects;
combining results of the separate forward proejecting;
back-projecting the combined results as functional information and not the structural information;
renormalizing the first and second zonal image objects that vary from zone-to-zone; and
generating an image of a patient from the image object.

28. The method of claim 27 wherein deriving comprises deriving from the disease specific feature.

29. The method of claim 27 wherein deriving comprises deriving from the biomarker specific feature.

30. The method of claim 27 wherein acquiring comprises acquiring with the structural information being in at least a third zone as well as the first and second zones, wherein generating comprises generating the first and second zonal image objects and a third zonal image object, and wherein forward projecting comprises separately forward projecting the first, second, and third zonal image objects.

31. The method of claim 27 wherein renormalizing comprises optimizing a scaling factor for each of the first and second zonal image objects based on a minimized merit function.

\* \* \* \* \*